United States Patent
Miyawaki et al.

(10) Patent No.: US 6,301,432 B2
(45) Date of Patent: *Oct. 9, 2001

(54) DATA RECORDING/REPRODUCING APPARATUS WITH A PLURALITY OF RECORDING/REPRODUCING UNITS AND CAPABLE OF DATA RECOVERY

(75) Inventors: Hiroyuki Miyawaki; Yasuo Iwasaki, both of Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,998

(22) PCT Filed: Apr. 10, 1997

(86) PCT No.: PCT/JP97/01250

§ 371 Date: Jun. 9, 1998

§ 102(e) Date: Jun. 9, 1998

(30) Foreign Application Priority Data

Apr. 12, 1996 (JP) .................................................. P8-115531

(51) Int. Cl.[7] ................................. H04N 5/76; H04N 5/94
(52) U.S. Cl. ............................................. 386/113; 386/125
(58) Field of Search ........................... 386/46, 109, 124, 386/125, 126, 112, 47, 113; 714/710; 369/32, 48, 58; H04N 5/76, 5/94

(56) References Cited

U.S. PATENT DOCUMENTS

| | | | |
|---|---|---|---|
| 4,829,388 | * | 5/1989 | Nakayama et al. ..................... 386/47 |
| 5,088,081 | * | 2/1992 | Farr ......................................... 369/58 |
| 5,339,319 | * | 8/1994 | Yamane et al. ....................... 714/710 |
| 5,537,567 | * | 7/1996 | Galbraith et al. .................... 711/114 |
| 5,574,952 | * | 11/1996 | Brady et al. ............................ 710/68 |
| 5,719,985 | * | 2/1998 | Ito et al. .............................. 386/109 |
| 5,754,730 | * | 5/1998 | Windrem et al. .................... 386/124 |

FOREIGN PATENT DOCUMENTS

| | | | |
|---|---|---|---|
| 4-52725 | 2/1992 | (JP) | ................. G06F/3/06 |
| 6-110619 | 4/1994 | (JP) | ................. G06F/3/06 |
| 6-230903 | 8/1994 | (JP) | ................. G06F/3/06 |
| 7-212737 | 8/1995 | (JP) | ................. H04N/7/16 |
| 8-171459 | 7/1996 | (JP) | ................. G06F/3/06 |

* cited by examiner

*Primary Examiner*—Huy Nguyen
(74) *Attorney, Agent, or Firm*—Bell, Boyd & Lloyd LLC

(57) ABSTRACT

A data recording/reproducing apparatus applicable to, for example, an editing system having a plurality of hard disk units arranged to be in parallel operated to record/reproduce a video signal to be capable of recovering abnormal data without any interruption with the operations for recording/reproducing continuous data. The operations of a plurality of data recording/reproducing blocks are managed in time by a time slot to use a period of a blank time slot if an abnormal condition appears in one recording/reproducing block to recover abnormal data with data recorded on another recording/reproducing block.

12 Claims, 17 Drawing Sheets

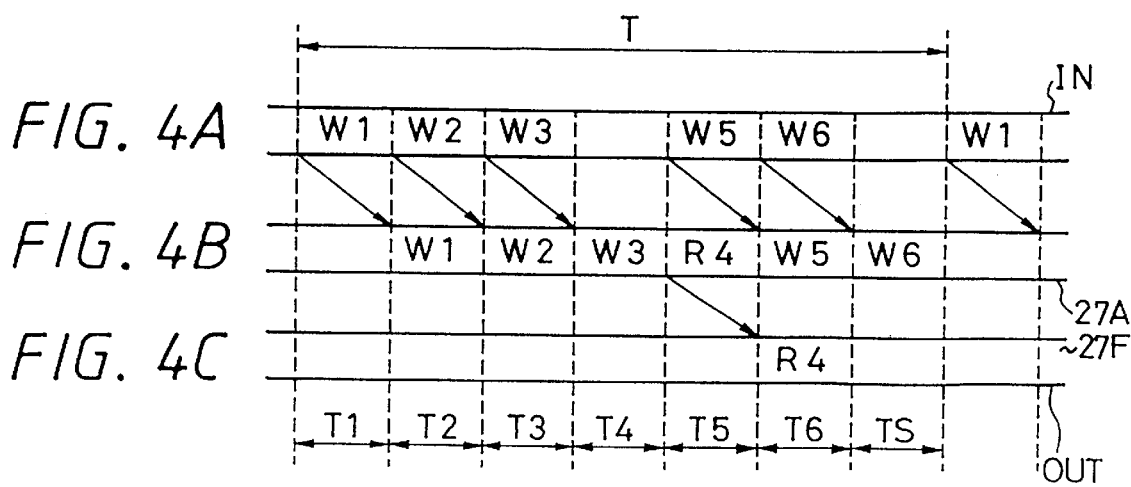
FIG. 4A
FIG. 4B
FIG. 4C
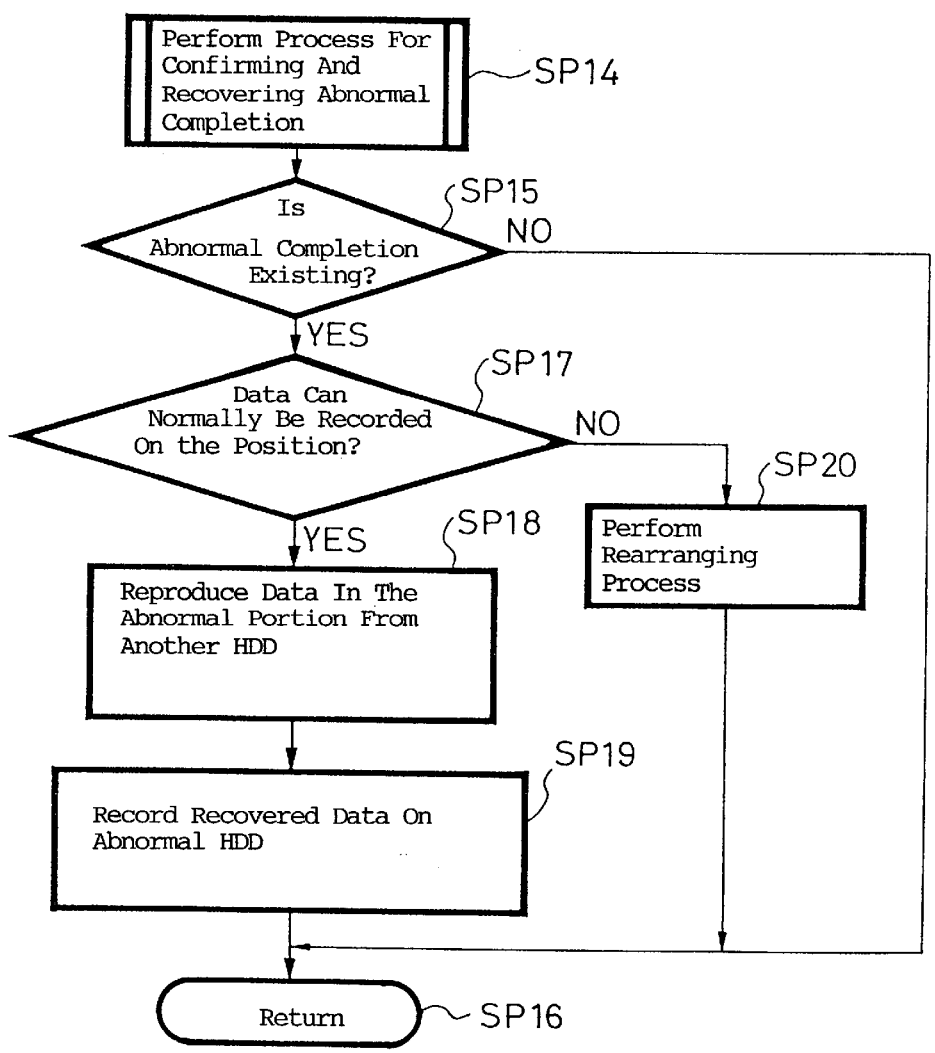
FIG. 5

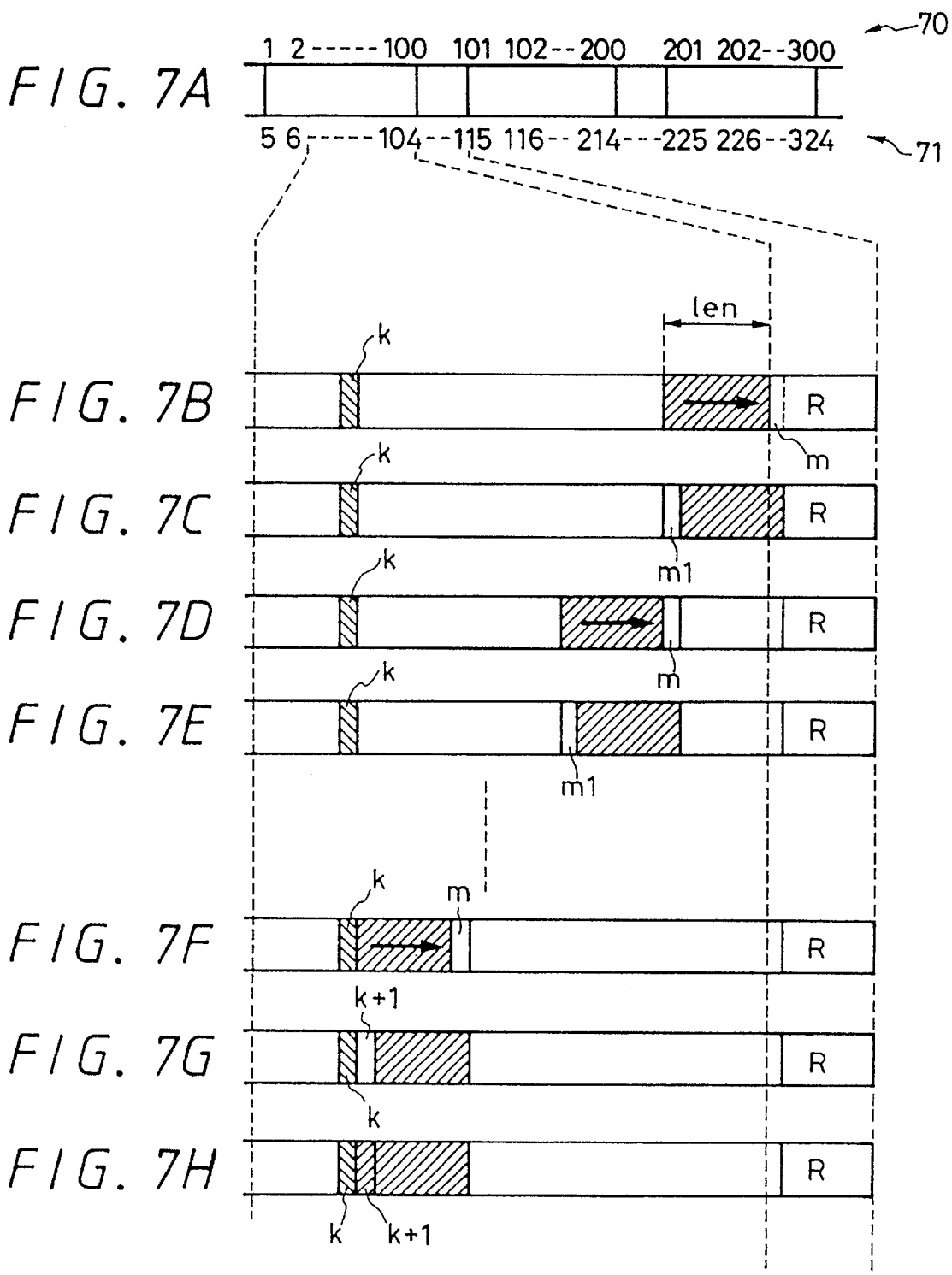

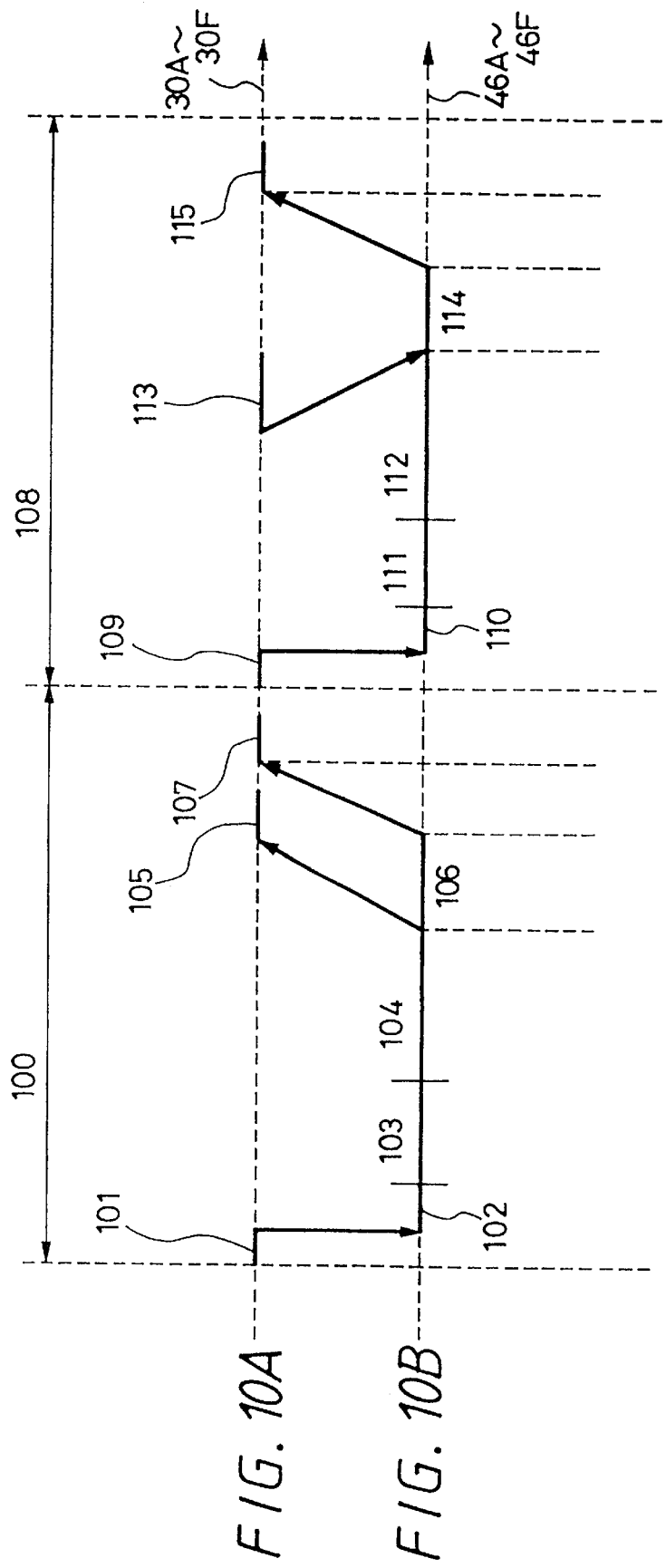

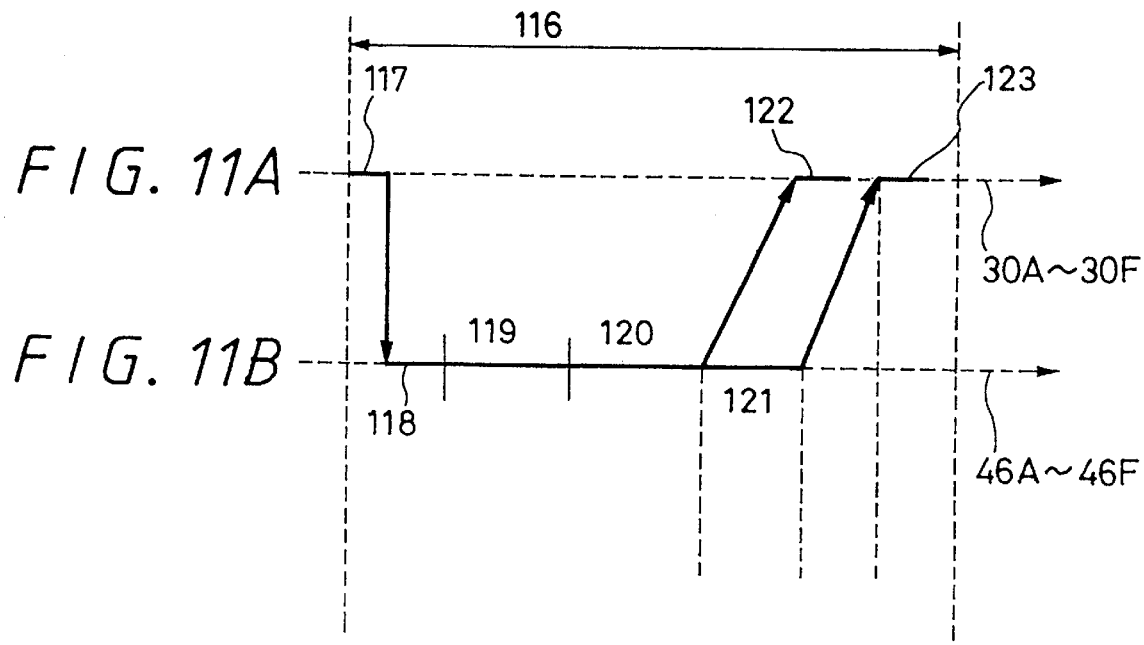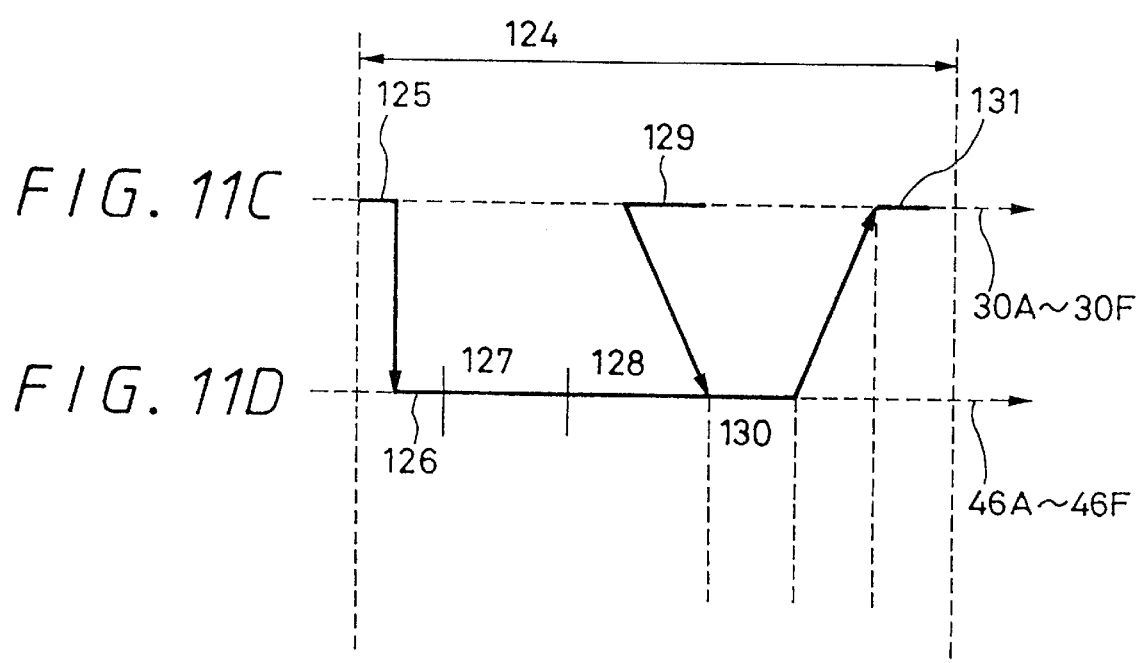

F I G. 12
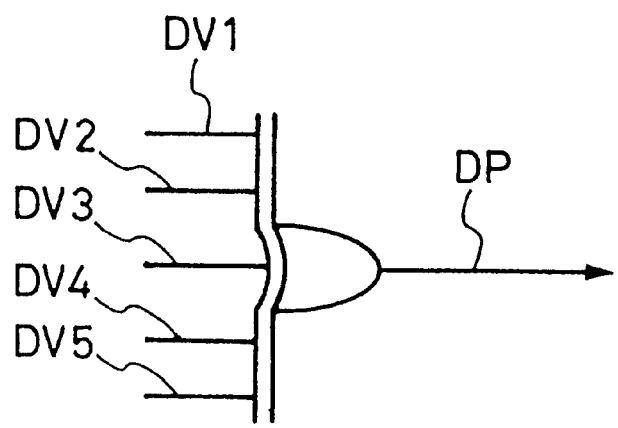
F I G. 13
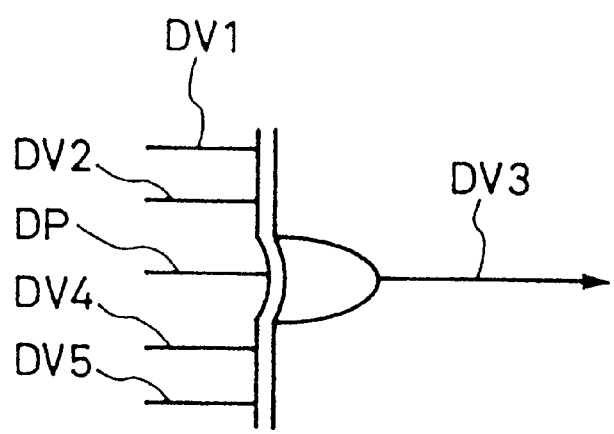

FIG. 14

| DV1 | 0 | 0 | 0 | 0 | 0 | 0 | 0 | 1 | 1 | 1 | 1 | 1 | -------- |
|-----|---|---|---|---|---|---|---|---|---|---|---|---|----------|
| DV2 | 0 | 0 | 0 | 0 | 1 | 1 | 1 | 0 | 0 | 0 | 0 | 1 |          |
| DV3 | 0 | 0 | 1 | 1 | 0 | 0 | 1 | 1 | 0 | 0 | 1 | 0 |          |
| DV4 | 0 | 1 | 0 | 1 | 0 | 1 | 0 | 1 | 0 | 1 | 0 | 1 |          |
| DV5 | 0 | 0 | 0 | 0 | 0 | 0 | 0 | 0 | 0 | 0 | 0 | 0 |          |
| DP  | 1 | 0 | 0 | 1 | 0 | 1 | 1 | 0 | 0 | 1 | 1 | 0 | 1 -------- |

FIG. 15

| DV1 | 0 | 0 | 0 | 0 | 0 | 0 | 0 | 1 | 1 | 1 | 1 | 1 | -------- |
|-----|---|---|---|---|---|---|---|---|---|---|---|---|----------|
| DV2 | 0 | 0 | 0 | 0 | 1 | 1 | 1 | 0 | 0 | 0 | 0 | 1 |          |
| DVP | 1 | 0 | 0 | 1 | 0 | 1 | 1 | 0 | 0 | 1 | 1 | 0 | 1 -------- |
| DV4 | 0 | 1 | 0 | 1 | 0 | 1 | 0 | 1 | 0 | 1 | 0 | 1 |          |
| DV5 | 0 | 0 | 0 | 0 | 0 | 0 | 0 | 0 | 0 | 0 | 0 | 0 |          |
| DV3 | 0 | 0 | 1 | 1 | 0 | 0 | 1 | 1 | 0 | 0 | 1 | 1 | 0 -------- |

FIG. 16

| Byte | Contents |
|---|---|
| 0 | 00H |
| 1 | (Identifier) |
| 3 | Number Of Registration (MSB) |
| 4 | Number Of Registration (LSB) |
| 5 | ...... |
| 6 | ...... |
| 7 | ...... |
| 8 | ...... |
| 9 | Address 1 Of Defective Sector (MSB) |
| 10 | Address 1 Of Defective Sector |
| 11 | Address 1 Of Defective Sector |
| 12 | Address 1 Of Defective Sector (LSB) |
| 13 | Address 1 Of Corresponding Reserve Region |
| 14 | Address 1 Of Corresponding Reserve Region |
| 15 | Address 1 Of Corresponding Reserve Region |
| 16 | Address 1 Of Corresponding Reserve Region (LSB) |
| 17 | Address 2 Of Defective Sector (MSB) |
| 18 | Address 2 Of Defective Sector |
| 19 | Address 2 Of Defective Sector |
| 20 | Address 2 Of Defective Sector (LSB) |
| 21 | Address 1 Of Corresponding Reserve Region (LSB) |
| 22 | Address 2 Of Corresponding Reserve Region |
| 23 | Address 2 Of Corresponding Reserve Region |
| 24 | Address 2 Of Corresponding Reserve Region (LSB) |
| . | ...... |
| . | ...... |
|  |  |

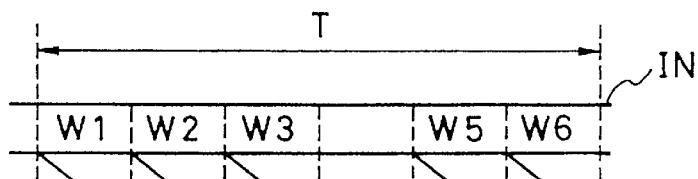
FIG. 23A
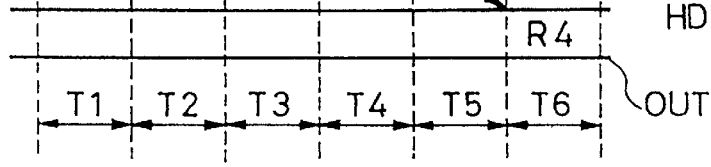
FIG. 23B
FIG. 23C

DATA RECORDING/REPRODUCING APPARATUS WITH A PLURALITY OF RECORDING/REPRODUCING UNITS AND CAPABLE OF DATA RECOVERY

TECHNICAL FIELD

The present invention relates to a data recording/ reproducing apparatus which can be applied to, for example, an editing apparatus having a plurality of hard disk units arranged to be operated in parallel with one another to record/reproduce a video signal. The present invention is structured in such a manner that time of the operations of the plural hard disk units is managed by dint of time slots. If any one of the hard disk units encounters an abnormal condition, the defect is recovered with data in another hard disk unit in a period of a blank time slot. Thus, data encountered the abnormal condition is recovered without any interference with an operation for recording/reproducing continuous data.

BACKGROUND ART

Hitherto, an editing system and the like have a structure that a video signal is accumulated in a hard disk unit. An apparatus of the foregoing type is enabled to reliably record/reproduce a high quality, large volume and high transferrate video signal by a structure arranged in such a manner that a disk array apparatus is formed by a plurality of hard disk units. The disk array apparatus forms a RAID (Redundent Array of Inexpensive Disks) having considerable redundancy.

FIG. 22 is a block diagram showing the schematic structure of the disk array apparatus forming the RAID. The disk array apparatus 1 inputs/outputs data D1 to and from a host through a disk-array controller 2. The disk-array controller 2 manages the operations of a plurality of hard disk units HDD1 to HDD5. The disk array apparatus 1 sequentially and circularly assigns, for example, one byte data (indicated with numerals 0, 1, 2, 3, . . .) forming data D1 to five hard disk units HDD0 to HDD4 except for the hard disk unit HDD5. Moreover, the disk array apparatus generates parity data P0, P1, . . . , composed of recovering data from data assigned to the hard disk units HDD0 to HDD4. Then, the disk array apparatus assigns parity data P0, P1, . . . , to the residual hard disk unit HDD5.

If any one of the hard disk units cannot easily reproduce data, the disk array apparatus 1 forming the RAID is arranged to obtain an exclusive OR of data reproduced by the other hard disk unit. Thus, the disk array apparatus is able to easily and quickly recover data. As a result, a reliable recording/reproducing system can be formed by that extent.

When a disk array apparatus of the foregoing type is applied to an editing apparatus or the like, video signals of a plurality of channels must be recorded/reproduced. On the other hand, hard disk units each having a usual input/output interface, such as a SCSI (Small Computer System Interface), are arranged to input/output data asynchronously with one another. Therefore, the hard disk units having the usual input/output interface have a problem in that a disk array apparatus of the foregoing type cannot easily be formed to record/reproduce a video signal without interruption. That is, recording/reproducing of a video signal without interruption requires continuity of the video signal to be maintained. To maintain the continuity, video signals of plural channels must synchronously be recorded/reproduced. The foregoing fact also applies to an audio signal which must be recorded/reproduced together with the video signal.

As a method of solving the above-mentioned problem, it might be considered feasible to employ a method using time slots for managing time to in parallel operating a plurality of disk array apparatuses.

That is, in a case where a system is formed in which video data can be input/output among six hosts when video data for one channel can be recorded by one disk array apparatus, for example, six disk array apparatuses are prepared. Moreover, the time base of video data of each channel is compressed to be simultaneously and in parallel assigned and output to the six disk array apparatuses. In addition, the overall operation is controlled as shown in FIG. 23 in such a manner that the operations are repeated in a cycle of a predetermined time T. Each time T is separated into pieces, the number of which is the same as that of the hosts so that time slots T1 to T6 are formed. The time slots T1 to T6 are sequentially assigned to the respective hosts. Then, video data items of the respective channels are input/output to and from the disk array apparatus in the corresponding time slots T1 to T6.

As a result, the respective disk array apparatuses receive, from the first to third hosts, data W1, W2 and W3 in the time slots T1, T2 and T3. Then, the disk array apparatus distributes respective data W1, W2 and W3 to the five hard disk units HDD0 to HDD4, and then records data in the following time slots T2, T3 and T4. At this time, the disk array apparatus generates parity data from the respective data W1, W2 and W3. The parity data are recorded on the residual hard disk unit HDD5 in the time slots T2, T3 and T4 (see FIGS. 23 (A) and 23 (B)).

When a read command has been input from the fourth host in the time slot T4, data R4 is read from each of the hard disk units HDD0 to HDD5. In the next time slot T5, the data R4 is output to the host (FIGS. 23 (B) and 23 (C)). It can therefore be considered that data of six channels indicated with numerals 1 to 6 can synchronously be recorded/reproduced.

However, a hard disk unit of the above-mentioned type sometimes encounters occurrence of a seek error. A hard disk unit having a usual input/output interface, such as the SCSI or the like, again performs seeking in this case, that is, performs retrial. If such a retrial operation is performed in any one of the hard disk units in, for example, the time slot T2, this hard disk unit cannot easily complete recording of data W1 in the time slot T2. Thus, recording of data W1 also requires the next time slot T3. Therefore, the foregoing hard disk unit cannot easily record data W2 which must be recorded inherently in the next time slot T3. As a result, a portion of the data W2 assigned to the foregoing hard disk unit is lost from the viewpoint of the overall system.

Even if the process is completed in the time slot, recording of an erroneous data for some reason or other cannot completely be prevented. Also in this case, a portion of data is undesirably lost. If data can correctly be recorded in the hard disk unit, a portion of data is sometimes lost attributable to a latter defect.

Although data, a portion of which has been lost, can be recovered by using data in another hard disk unit, the redundancy of the data above deteriorates as compared with other data items. As a result, the reliability of the system deteriorates.

In the foregoing case, a method may be considered in which the same data item is again resent from the host to recover lost data as is performed in a usual apparatus using the hard disk unit. However, difficulties are sometimes associated with resending of data when the method is applied to a process for recording/reproducing a video signal. Moreover, the load which must be borne by the host is increased.

If data, a portion of which has been lost, can correctly be recovered without any interruption of the operations for recording/reproducing continuous a video signal and an audio signal, deterioration in the redundancy can effectively be prevented. As a result, the reliability of the overall system can be improved by that extent. What is more, increasement of the load, which must be borne by the host to recover data, can effectively be avoided.

In view of the foregoing, according to the present invention, there is proposed a data recording/reproducing apparatus capable of recovering data, which cannot easily and correctly be recorded/reproduced, without any interruption of the operation for recording/reproducing continuous data.

DISCLOSURE OF THE INVENTION

A data recording/reproducing apparatus according to the present invention is a data recording/reproducing apparatus in which the operations of a plurality of recording/reproducing blocks are managed in time by a time slot to assign required data for record to the above plural recording/reproducing blocks so as to simultaneously and in parallel record/reproduce data for record, wherein reproduction of recorded data for record in a certain system is enabled with data for record in another system by assigning, together with data for recovery, data for record to the above plural recording/reproducing blocks, and when any one of the above plural recording/reproducing blocks has encountered an abnormal condition, the data for record and the data for recovery recorded in another recording/reproducing block are used to recover data for record in the abnormal recording/reproducing block in a time slot in which an access to the recording/reproducing block is not required.

The data recording/reproducing apparatus according to the present invention has a structure that when the abnormal condition is an abnormal condition in which the above data for record cannot correctly be recorded in the corresponding time slot, data for record is recovered from the data for record and the data for recovery recorded in the other recording/reproducing block to again record the data at a corresponding recording position so that data for record in the abnormal recording/reproducing block is recovered.

The data recording/reproducing apparatus according to the present invention has a structure that when the abnormal condition is an abnormal condition in which the above data for record cannot correctly be reproduced in the corresponding time slot, the corresponding recording/reproducing position is avoided and recorded data is rearranged, and then data for record is reproduced by using the data for record and the data for recovery recorded in the other recording/reproducing block and recorded again so that the data for record in the abnormal recording/reproducing block is recovered.

The data recording/reproducing apparatus according to the present invention has a structure that when the abnormal condition is an abnormal condition in which data for record cannot correctly be reproduced in the corresponding time slot, corresponding data for record is again reproduced in a time slot in which an access to the recording/reproducing block is not required to confirm the above abnormal condition, and then the data for record in the abnormal recording/reproducing block is recovered.

The data recording/reproducing apparatus according to the present invention has a structure that data for record in a plurality of channels is received, and data for record to be assigned to the plural recording/reproducing blocks is switched with data for record in the plural channels in each of the above time slots.

With the present invention mentioned above, when any one of the recording/reproducing blocks has encountered an abnormal condition, data for record and data for recovery recorded on another recording/reproducing block are used to recover data in a time slot in which an access to the recording/reproducing block is not required.

A variety of processes can be performed in the time slot in which an access to the recording/reproducing block is not required without any interruption of the required recording/reproducing process. As a result, data which cannot easily and correctly be recorded/reproduced can be recovered without any interruption of the process for recording/reproducing continuous data.

A data recording/reproducing apparatus according to the present invention is a data recording/reproducing apparatus in which so as to enable data in a certain system to be recovered with data in another system, data for recovery and required data are assigned to a plurality of recording/reproducing blocks to be recorded and reproduced, wherein required data is recorded/reproduced along concentric tracks or a spiral track, when a defective sector has appeared, recording positions for recorded data following the defective sector are shifted by one sector along the above track, and data assigned to the defective sector is recovered with data recorded on the other recording/reproducing block, and then recorded on a sector following the defective sector.

The data recording/reproducing apparatus according to the present invention is such one that movement of the recorded data is performed at a unit of a predetermined quantity of data.

The data recording/reproducing apparatus according to the present invention is such that a spare sector is prepared in advance and the movement of the recorded data is performed from the above defective sector to the above spare sector.

The data recording/reproducing apparatus according to the present invention is such one that the above recording/reproducing block makes an access to a required sector by using a logical address input together with a control command, and above the data recording/reproducing apparatus issues the above logical address to skip the defective sector.

A data recording/reproducing apparatus according to the present invention is a data recording/reproducing apparatus is which in order to enable data for record in a certain system to be reproduced from data for record in another system, the data for record and data for recovery are assigned to and recorded on a plurality of recording/reproducing blocks so that data for record is reproduced from the above plurality of recording/reproducing blocks, wherein the above plural recording/reproducing blocks divide an information recording region, which can be specified and accessed from the outside, into a main information recording region and a sub information recording region, the above data recording/reproducing apparatus assigns and record the data for record and the data for recovery to and on the main information recording region, and when any one of the plural recording/reproducing blocks has encountered an abnormal condition, the data for record and data for recovery recorded in another recording/reproducing block are used to recover the data for record in the abnormal recording/reproducing block, and then the recovered data for record is recorded on the sub information recording region in place of the main information recording region.

The data recording/reproducing apparatus according to the present invention is such that the corresponding relation between the sub information recording region, on which the recovered data for record has been recorded, and the corresponding main information recording region is recorded on a corresponding recording/reproducing block.

The data recording/reproducing apparatus according to the present invention is such that time of the operations of the above plural recording/reproducing blocks is managed by a time slot, and a process for recording the recovered data on the sub information recording region in place of the main information recording region is performed in a time slot in which an access to the recording/reproducing block is not required.

With the present invention described as above, when any one of the recording/reproducing blocks has encountered an abnormal condition, data for record and data for recovery recorded on another recording/reproducing block are used to recover data in a time slot in which an access to the recording/reproducing block is not required.

A variety of processes can be performed in the time slot in which an access to the recording/reproducing block is not required without any interruption of the required recording/reproducing process. As a result, data which cannot easily and correctly be recorded/reproduced can be recovered without any interruption of the process for recording/ reproducing continuous data.

BRIEF DESCRIPTION OF DRAWINGS

FIGS. 4A to 4C are time charts for use to explain a time slot;

FIG. 5 is a flow chart of a process for confirming the end of abnormality and recovering the abnormality;

FIGS. 7A to 7H are time charts for explaining the rearranging process;

FIGS. 10A and 10B are time charts for use to explain a process for in series performing a data recovering process;

FIG. 11 to 11D are time charts for use to explain data recovery which is performed by the disk array apparatus shown in FIG. 9;

FIG. 12 is a diagram showing the connection of input/output data to and from a parity calculating circuit which is employed when a recording operation is performed;

FIG. 13 is a diagram showing the connection of input/output data to and from the parity calculating circuit which is employed when data is recovered;

FIG. 14 is a table for use to explain the operation of the parity calculating circuit which is performed when a recording operation is performed;

FIG. 15 is a table for use to explain the operation of the parity calculating circuit which is performed when data is recovered;

FIG. 16 a table showing a defect processing list;

FIGS. 23A to 23C are time charts of a process for managing time of the operation of the disk array apparatus shown in FIG. 9 by dint of a time slot.

BEST MODE FOR CARRYING OUT THE INVENTION

Figure 1:
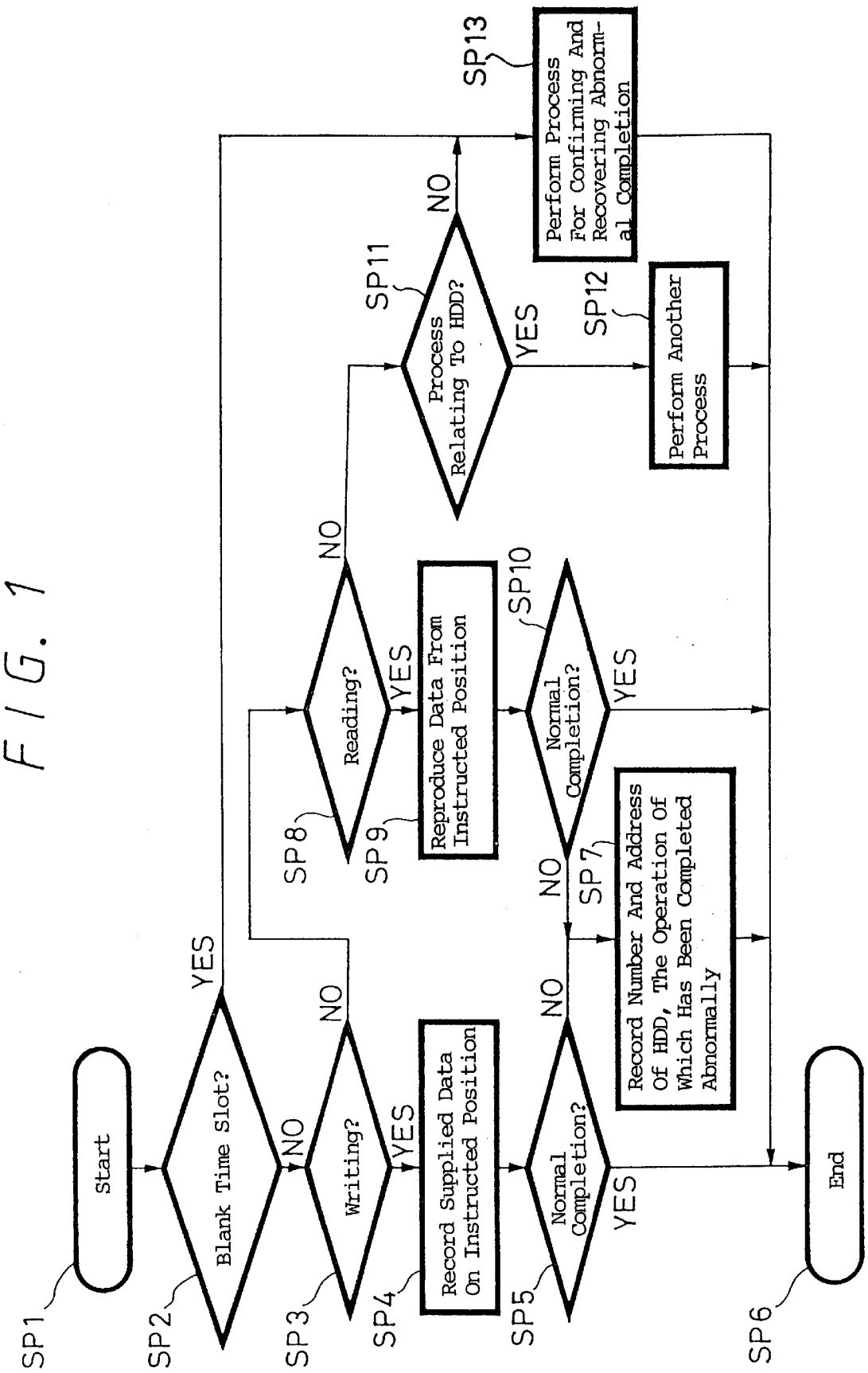
FIG. 1 is a flow chart of processes which are performed in a system control circuit of a recording/reproducing apparatus according to an embodiment of the present invention.

Referring to the drawing, embodiments of the present invention will suitably be described in detail.

(1) First Embodiment (1-1) Overall Structure

Figure 2:
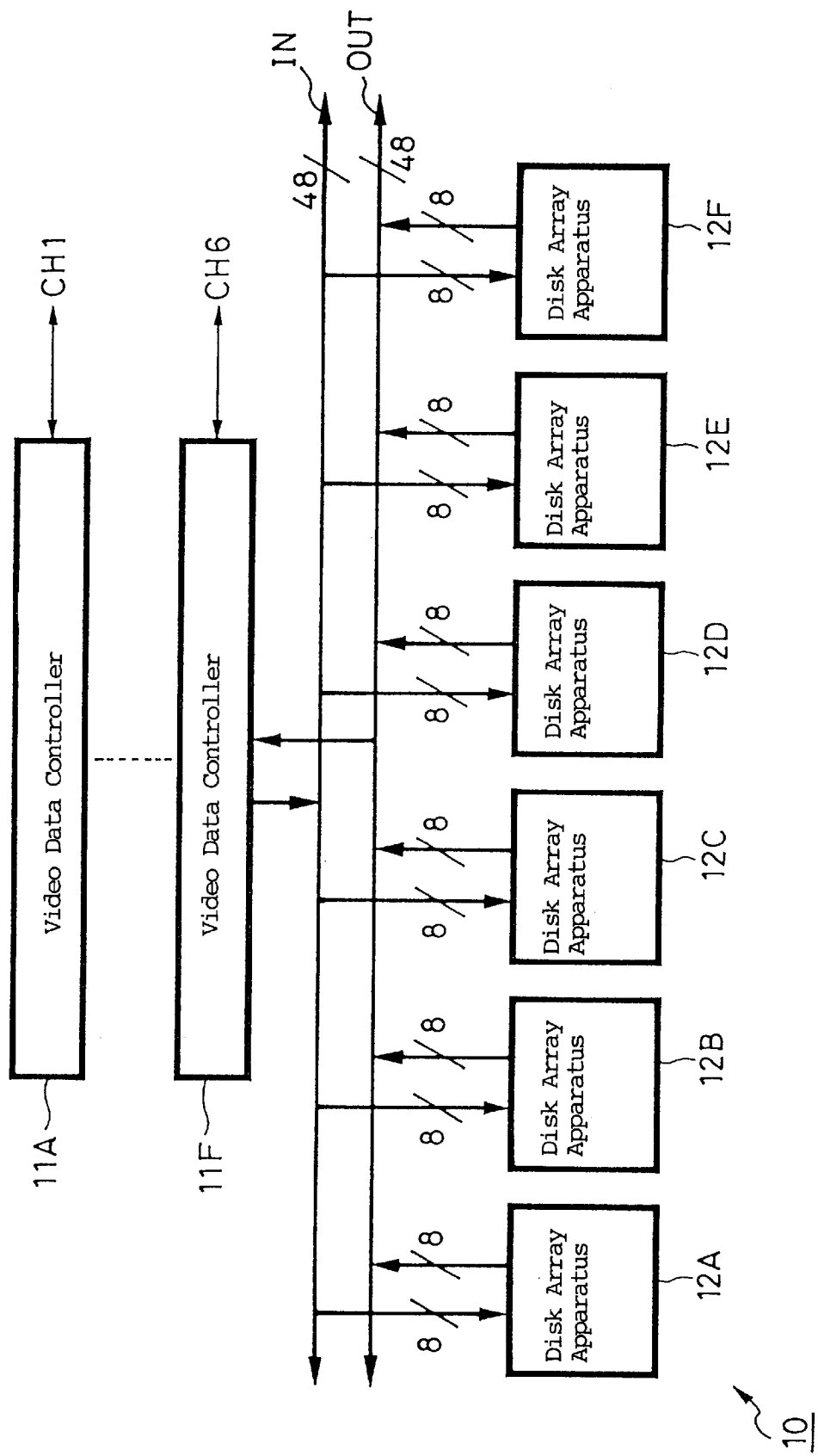
FIG. 2 is a block diagram showing the overall structure of the recording/reproducing apparatus shown in FIG.

FIG. 2 is a block diagram showing a recording/reproducing apparatus according to the embodiment of the present invention. The recording/reproducing apparatus 10 is applied to an editing system. The recording/reproducing apparatus 10 has 48-bit data buses IN and OUT for inputting and outputting data. Six video-data controllers 11A to 11F and six disk array apparatuses 12A to 12F are connected to the data buses IN and OUT.

Each of the video-data controllers 11A to 11F is an input/output circuit for inputting/outputting video data of each of channels CH1 to CH6 which compresses the time base of video data input from a host side by a built-in buffer memory, adds a control command, synchronizing data and the like thereto and outputs 48-bit parallel video data to the data bus IN at predetermined timing. At predetermined timing, each of the video-data controllers receives 48-bit parallel video data, which is output to the output data bus OUT, to elongate the time base, and then converts the above video data into video data having a predetermined format to output converted video data.

Video data in each of the channels CH1 to CH6 is composed of a digital video signal, data of which has been compressed by an MPEG or the like, and synchronously supplied from the host to the video-data controllers 11A to 11F. Each of the video-data controllers 11A to 11F manages time in accordance with video data above so that sharing of the data buses IN and OUT is sequentially permitted for a predetermined period of time.

That is, the recording/reproducing apparatus is arranged to divide the period of one frame of video data into seven time slots, the number of which is an integer obtained by adding one to the number of the video-data controllers 11A to 11F. Then, the respective time slots are sequentially assigned to the video-data controllers 11A to 11F. Moreover, the one residual time slot is set to be a blank time slot.

As a result, each of the video-data controllers 11A to 11F, together with a control command and the like, outputs video data for one frame amount, the time base of which has been compressed, to the data bus IN in the time slot each having a period of ⅐ frame and assigned to each of the video-data controllers. On the contrary, each of the video-data controllers 11A to 11F fetches a 48-bit parallel data string from the output data bus OUT in its own time slot, then elongates the time base of data except for status data and the like, and then converts data into video data to be output.

On the other hand, each of the disk array apparatuses 12A to 12F has 8-bit data buses for input and output, and connects 8 bits each from the upper sides of the 48-bit data buses IN and OUT to the input and output data buses sequentially. As a result, each of the disk array apparatuses 12A to 12F shares eight bits from the upper sides of the data buses IN and OUT to record video data output from each of the video-data controllers 11A to 11F and to output reproduced video data. Note that the respective video-data controllers 11A to 11F and the respective disk array apparatuses 12A to 12F perform mutual communications through a SCSI interface.

(1-1-1) Disk Array Apparatus

Figure 3:
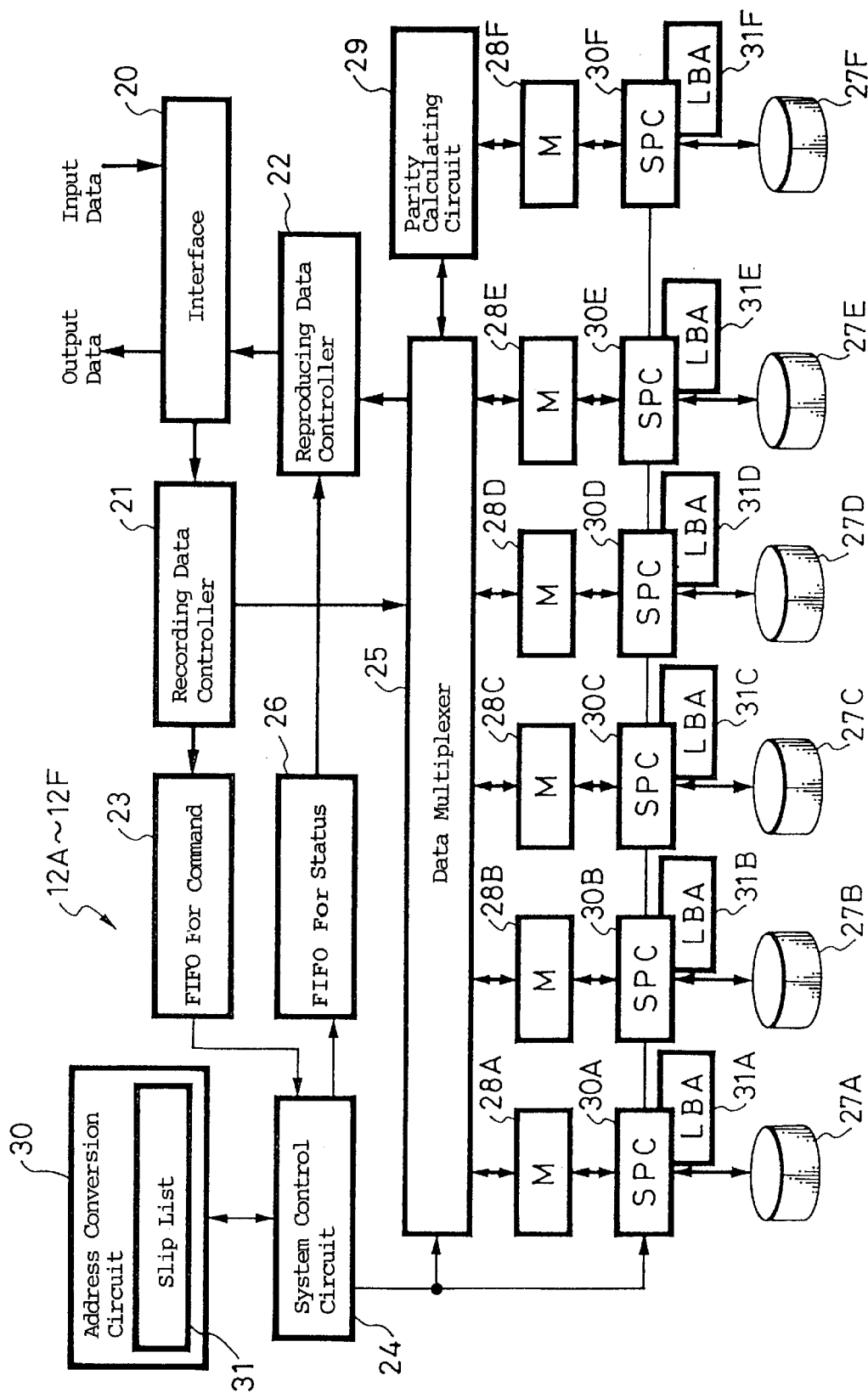
FIG. 3 is a block diagram showing a disk array apparatus shown in FIG. 2.

FIG. 3 is a block diagram showing each of the disk array apparatuses 12A to 12F. Each of the disk array apparatuses 12A to 12F has a common structure to input/output video data to and from the data buses IN and OUT through an interface circuit 20. The interface circuit 20 converts 8-bit parallel video data supplied from the input data bus IN into a data string having a predetermined bit length to output the data string to a recording data controller 21. On the contrary, the interface circuit converts video data output from a reproducing data controller 22 and having a predetermined bit length into an 8-bit parallel data string to output the data string to the output data bus OUT.

The recording data controller 21 detects synchronizing data from the data output from the interface circuit 20, and then detects a control command based on the synchronizing data. Moreover, the recording data controller 21 outputs the control command to a system control circuit 24 through a FIFO 23 for a command. In addition, the recording data controller outputs the subsequent video data to a data multiplexer 25. As a result, the recording data controller 21 separates the control command and the video data output from each of the video-data controllers 11A to 11F from each other to output the separated control command and the video data to the system control circuit 24 and the data multiplexer 25. If necessary, the recording data controller repeats the above-mentioned process at each time slot.

On the contrary to the recording data controller 21, the reproducing data controller 22 receives status data output from the system control circuit 24 through a FIFO 26 for status to generate synchronizing data. Moreover, the reproducing data controller 22 adds synchronizing data and status data to video data output from the data multiplexer 25 to output a result of the addition. The reproducing data controller 22 is controlled by the system control circuit 24 to repeat the above-mentioned process at each time slot, if necessary.

The data multiplexer 25 is controlled by the system control circuit 24 to switch the operation at every time slot, if necessary. That is, the data multiplexer 25 assigns video data to be recorded to respective hard disk units 27A to 27E so as to output the same to buffer circuits (M) 28A to 28E each comprising a memory circuit. Moreover, the data multiplexer collects assigned data items to output the same to a parity calculating circuit 29. Note that assignment of video data is performed in such a manner that one byte of a data string output from the recording data controller 21 is used as a unit.

On the contrary, the data multiplexer 25 receives video data reproduced by the respective hard disk units 27A to 27E through the buffer circuits 28A to 28E to output the video data to the reproducing data controller 22. When an abnormal condition has been detected in any one of the hard disk units 27A to 27E, the data multiplexer 25 temporarily outputs video data of the other hard disk units to the parity calculating circuit 29 in accordance with communication made from the system control circuit 24, and then compensates defective data with video data returned from the parity calculating circuit 29 to output compensated data. As a result, the disk array apparatuses 12A to 12F recovers video data of the hard disk unit encountered the abnormal condition with video data output from the parity calculating circuit 29 and output recovered video data.

When the data multiplexer 25 is, by the system control circuit 24, assigned to data recovery, the data multiplexer performs a process for transferring video data required to the data recovery between the buffer circuits 28A to 28E and the parity calculating circuit 29. That is, the data multiplexer 25, through the buffer circuits 28A to 28E, receives video data obtainable from the other hard disk units except for the hard disk unit encountered the abnormal condition, and outputs the supplied video data to the parity calculating circuit 29. Then, the data multiplexer outputs video data returned from the parity calculating circuit 29 to the buffer circuits 28A to 28E so as to be supplied to the hard disk unit encountered the abnormal condition.

In the time slot which is assigned to recording, the parity calculating circuit 29 obtains an exclusive OR of video data output from the data multiplexer 25 to generate parity data of each video data. The parity calculating circuit outputs generated parity data to the buffer circuit (M) 28F comprising a memory circuit. In a time slot assigned to reproduction, on the contrary, the parity calculating circuit receives parity data output from the hard disk unit 27F through the buffer circuit 28. If an abnormal condition is detected in any one of the hard disk units 27A to 27E, the parity calculating circuit obtains an exclusive OR of video data in the other hard disk unit and reproduced parity data in accordance with a required made by the system control circuit 24. Thus, the parity calculating circuit reproduces video data in the hard disk unit encountered the abnormal condition and returns the video data to the data multiplexer 25.

On the other hand, when being assigned to the data recovery by the system control circuit 24, a process similar to the process which is performed in the time slot assigned to the reproduction is performed. In this case, however, if an abnormal condition is detected in the hard disk unit 27F on which parity data is recorded, the parity calculating circuit 29 performs a calculation for obtaining an exclusive OR by using video data in the other hard disk unit input by the data multiplexer 25, so as to generate parity data. Then, the parity calculating circuit outputs the generated parity data to the buffer circuit 28F.

The buffer circuits 28A to 28E are controlled by controllers (not shown) assigned to the respective hard disk units 27A to 27E so that their operations are switched. In the time slot assigned to recording, the buffer circuits output video data supplied from the data multiplexer 25 to SCSI controllers (SPC) 30A to 30E. On the other hand, the buffer circuit 28F, in link with the operations of the buffer circuits 28A to 28E, outputs the parity data output from the parity calculating circuit 29 to a SCSI controller 30F.

In the time slot assigned to the reproduction, on the other hand, the buffer circuits 28A to 28E maintain the video data supplied through the SCSI controllers 30A to 30E, and then output video data to the data multiplexer 25 at a synchronized timing. In link with this, the buffer circuit 28F maintains the parity data supplied through the SCSI controller 30F, and then inputs the parity data to the parity calculating circuit 29.

In the time slot assigned to data recovery, the buffer circuits 28A to 28F corresponding to the hard disk units except for the abnormal hard disk unit, similarly in the time slot assigned to the reproducing process, store data supplied through the SCSI controllers 30A to 30E. Then, the buffer circuits output the data to the data multiplexer 25 and the parity calculating circuit 29 at a predetermined timing. On the other hand, the buffer circuit corresponding to the abnormal hard disk unit outputs, to the SCSI controllers 30A to 30F, recovered data (composed of video data or parity data) supplied from the data multiplexer 25 or the parity calculating circuit 29.

The SCSI controllers 30A to 30E respond to a control command issued from the system control circuit 24 and supplied through the SCSI interface to change the operations thereof to control the operations of the hard disk units 27A to 27E, respectively. Specifically, in the time slot assigned to recording, each of the operation modes of the hard disk units 27A to 27E is set to a writing operation mode. Thus, video data and parity data supplied through the buffer circuits 28A to 28F are recorded on the hard disk units 27A to 27E. On the contrary, in the time slot assigned to reproduction, each of the hard disk units 27A to 27F is set to the reading operation mode. Thus, video data and parity data are reproduced from the respective hard disk units 27A to 27F and are output to the buffer circuits 28A to 28F. In the time slot assigned to the data recovery, in response to a control command issued from the system control circuit 24, the hard disk units except for the abnormal hard disk unit are set to the reading operation mode and the abnormal hard disk unit is set to the writing operation mode.

As described above, when the writing and reading processes are performed, the SCSI controllers 30A to 30E convert logical addresses output from the system control circuit 24 into physical addresses in accordance with included conversion lists (LBA) 31A to 31F of logical and physical addresses. Then, the SCSI controllers make accesses to the hard disk units 27A to 27F in accordance with the physical addresses. The conversion lists 31A to 31F are formed during a process for initializing each of the hard disk units 27A to 27F to perform a so-called slipping process in which an initial defective sector is skipped when accesses are made.

Moreover, the SCSI controllers 30A to 30E report, to the system control circuit 24, results of the writing and reading operations obtained from the hard disk units. If a control command indicating an interruption is supplied from the system control circuit 24 during execution of the writing operation or the reading operation, the SCSI controllers interrupt the sequential processes and wait for input of a next control command.

Each of the hard disk units 27A to 27F, at a sector unit, writes and reads video data and parity data in accordance with each of the control commands and the physical addresses supplied from the SCSI controllers 30A to 30E. Moreover, each of the hard disk units performs a read-after-write process during the writing process to detect whether or not video data and parity data have been written correctly. Then, the hard disk units 27A to 27F communicate results to the corresponding SCSI controllers 30A to 30E. When a reproducing operation is performed, each of the hard disk units detects whether or not correct reproduction has been performed in accordance with an error detection code added to video data. Then, a result of the detection is communicated to the corresponding SCSI controllers 30A to 30E.

The system control circuit 24 comprises a microcomputer for controlling the operation of each of the disk array apparatuses 12A to 12F. The system control circuit analyzes a control command supplied through the FIFO 23 for a command. In accordance with a result of the analysis, the system control circuit outputs status data and the like to the corresponding video-data controllers 11A to 11F. When a writing control command and a reading control command have been supplied from the video-data controllers 11A to 11F, the system control circuit issues a writing control command and a reading control command to each of the SCSI controllers 30A to 30E through the SCSI interface. Moreover, the system control circuit switches the operations of the data multiplexer 25 and the like.

At this time, the system control circuit 24 converts address data added to the control command into the logical addresses of the hard disk units 27A to 27F, and then outputs the control commands each of which is formed in accordance with the logical address to the SCSI controllers 30A to 30F. At this time, the system control circuit 24 outputs the logical address to address conversion circuit 30. Thus, the logical address is, for each of the hard disk units 27A to 27F, corrected in accordance with data in a slip list 31 included in the address conversion circuit 30, and then corrected logical address is output.

The slip list 31 is formed by mainly recording the logical addresses of defective sectors generated later in each of the hard disk units 27A to 27F. The address conversion circuit 30 corrects the logical address generated by the system control circuit 24 in accordance with data in the slip list in order to avoid the defective sector generated later by the slipping process. Thus, similarly to the slipping process, the system control circuit 24 is able to record/reproduce video data and parity data while avoiding the defective sector generated later.

(1-1-2) Defect Recovery Process in System Control Circuit

FIG. 1 is a flow chart of processes which are performed by the system control circuit. The system control circuit 24 repeats the foregoing process in each time slot to respond to the control commands output from the video-data controllers 11A to 11F so as to control the total operation of the disk array apparatus. If necessary, the system control circuit recovers data, which cannot correctly be recorded/reproduced.

That is, in synchronization with video data, the operation of the system control circuit 24 is shifted from start of step SP1 to step SP2 so as to determine whether or not the present time slot is a blank time slot. If the present time slot is a time slot assigned to any one of the video-data controllers 11A to 11F, a negative result is obtained, thus causing the operation of the system control circuit to be shifted to step SP3.

In step SP3 the system control circuit 24 determines whether or not the control command supplied from the FIFO 23 for a command is a write control command. If an affirmative result is obtained, the operation proceeds to step SP4 so that the system control circuit 24 generates a logical address from address data which is supplied together with the control command. The address conversion circuit 30 corrects the logical address. Then, the system control circuit 24 sequentially issues control commands to the SCSI controllers 30A to 30F in accordance with the corrected logical addresses so that video data is recorded on the regions instructed by the video-data controllers 11A to 11F. At this time, the system control circuit 24 as well as switches the operations of the data multiplexer 25 and the like.

After the system control circuit 24 has issued the write control commands, the system control circuit monitors status data returned from each of the SCSI controllers 30A to 30F. Thus, the system control circuit issues a write interruption control command to the SCSI controllers 30A to 30F from which status data indicating completion of normal writing cannot be obtained within a predetermined time.

In next step SP5 the system control circuit 24 determines whether or not all of the hard disk units 27A to 27F have completed the operations correctly. If an affirmative result is obtained, the operation proceeds to step SP6 so that the foregoing process is ended. If a hard disk unit (that is, a hard disk unit which has abnormally completed the writing process) from which status data indicating completion of normal writing cannot be obtained within the predetermined time exists, the system control circuit 24 obtains a negative result in step SP5. Thus, the operation of the system control circuit proceeds to step SP7. Then, the system control circuit 24 records an ID assigned to the hard disk unit, the operation of which has completed abnormally, on its built-in memory together with the logical address. Then, the operation is shifted to step SP6 so that the foregoing process is ended. The system control circuit 24 records the hard disk unit, with which the writing process has not been completed within the predetermined time attributable to a seeking error or the like, and a hard disk unit in which an error has been detected in the read-after-write operation as the hard disk units and so on, the operations of which have been completed abnormally.

If the write control command has not been input from the FIFO 23 for a command, the system control circuit 24 obtains a negative result in step SP3. Thus, the operation of the system control circuit proceeds to step SP8 so that the system control circuit 24 determines whether or not a reading control command has been supplied from the FIFO 23 for a command. If an affirmative result is obtained, the operation proceeds to step SP9. In this step, the system control circuit 24 generates the logical address from address data which is supplied together with the control command. The logical address is corrected by the address conversion circuit 30. In accordance with the corrected logical address, the system control circuit sequentially issues control commands to the SCSI controllers 30A to 30F. As a result, the system control circuit 24 reproduces video data from the regions instructed by the video-data controllers 11A to 11F. Note that the system control circuit 24, at this time, switches the operations of the data multiplexer 25 and the like, similarly to the writing operation.

After the system control circuit 24 has issued the read control command, the system control circuit monitors status data returned from each of the SCSI controllers 30A to 30F. Then, the system control circuit issues a control command to interrupt reading to the SCSI controllers 30A to 30F from which status data indicating completion of correct reading cannot be obtained within a predetermined time.

In next step SP10 the system control circuit 24 determines whether or not all of the hard disk units 27A to 27F have completed the operations correctly. If an affirmative result is obtained, the operation is shifted to step SP6 so that the foregoing process is ended. If a hard disk unit (a hard disk unit, the operation of which has been completed abnormally) from which status data indicating completion of correct reading cannot be obtained exists, the system control circuit 24 obtains a negative result in step SP10. Thus, the operation is shifted to step SP7 so that the system control circuit records, on its built-in memory, an ID and the logical address of the hard disk unit, the operation of which has been completed abnormally. Moreover, the system control circuit outputs control data to the data multiplexer 25 and the parity calculating circuit 29 to compensate video data in the hard disk unit, the operation of which has been completed abnormally, with video data obtained by the operation of the parity calculating circuit 29. Then, the operation is shifted to step SP6 so that the foregoing process is ended. Also in this case, the system control circuit 24 records, as hard disk units, the operations of which have been completed abnormally, the hard disk unit, with which the reading operation has not been completed within a predetermined time attributable to a seeking error, and a hard disk unit encountered a bit error in data reproduced therefrom attributable to a latter defect or the like.

If the write and read control commands are not supplied, the system control circuit 24 obtains a negative result also in step SP8 following step SP7. As a result, the operation proceeds to step SP11 so that whether or not control commands (which are control commands relating to the processes which are performed by the hard disk units) for making accesses to the hard disk units 27A to 27F except for the writing and reading control commands have been supplied from the FIFO 23 for a command. If an affirmative result is obtained here, the operation of the system control circuit 24 is shifted from step SP11 to step SP12 in which the system control circuit performs corresponding processes. Then, the operation is shifted to step SP6.

If a control command, which does not need to make accesses to the hard disk units 27A to 27F, is supplied, or if no control command is supplied, a negative result is obtained in step SP11. Therefore, the operation of the system control circuit 24 is shifted to step SP13. If the time slot is a blank time slot, the system control circuit 24 obtains a negative result in step SP2. Thus, the operation is directly shifted from step SP2 to step SP13.

In step SP13 the system control circuit 24 performs a process for confirming and recovering abnormality recorded in the memory in step SP7. Then, the operation is shifted to step SP6 so that the foregoing process is ended. As a result, the system control circuit 24 confirms the operation of the hard disk unit, operation of which has been completed abnormally, in the blank time slot TS (see FIGS. 4(A) to 4(C)) previously created by dividing one frame period T into seven time slots T1 to TS, as shown in FIG. 4. Moreover, the system control circuit uses the blank time slot TS to recover data, if necessary. As a result, data can be recovered without any interruption with the operations for recording/reproducing video data and without any loads which must be borne by the video-data controllers 11A to 11F.

In addition, the system control circuit 24 performs a similar process for confirming and recovering abnormal completion also in a time slot except for the predetermined blank time slot TS, the time slot being substantially a blank time slot in which an access to the hard disk unit is not required. As a result, abnormal completion, which has occurred once, can be confirmed and recovered in a short time. Thus, the reliability of whole the system can be improved by that extent.

That is, FIG. 5 is a flow chart showing the process for confirming and recovering the abnormal completion. The operation of the system control circuit 24 proceeds from step SP14 to step SP15 to confirm the contents of the memory. Thus, whether or not a hard disk unit, the operation of which has been completed abnormally, and which has not been subjected to the process for confirming and recovering the abnormal completion, exists is determined. If a negative result is obtained, the operation of the system control circuit 24 proceeds to step SP16, and then returned to step SP6 shown in FIG. 1.

On the contrary, if a hard disk unit, the operation of which has been completed abnormally, and which has not been subjected to the process for confirming and recovering the abnormal completion, exists, an affirmative result is obtained in step SP15. Thus, the operation of the system control circuit 24 proceeds to step SP17 so that the portion of the hard disk unit is instructed with the logical address and a write control command is issued. In this case, the system control circuit 24 records, on the portion of the hard disk unit, the operation of which has been completed abnormally, a predetermined test data item. Thus, the system control circuit monitors whether or not writing is completed in a predetermined period or whether or not recording and reproducing can normally be performed in accordance with a result of read-after-write. In accordance with a result of monitoring, the system control circuit determines whether or not video data can normally be recorded on the foregoing portion.

As for a hard disk unit, the operation of which has been completed abnormally attributable to a seeking error or the like because of disturbance or the like, an affirmative result can be obtained because test data can normally be written in the writing process in step SP17. In this case, the operation of the system control circuit 24 proceeds to step SP18. The system control circuit 24 switches the overall operation to the operation for recovering data. Thus, the system control circuit reproduces corresponding video data from the other hard disk unit to cause the parity calculating circuit 29 to generate video data in the hard disk unit, the operation of which has been completed abnormally.

Then, the system control circuit 24, in next step SP19, again records generated video data on the corresponding portion of the hard disk unit, the operation of which has been completed abnormally. As a result, data in the hard disk unit, the operation of which has been completed abnormally, can be recovered. After the recovering process has been completed, the system control circuit 24 deletes a corresponding item from the memory. Then, the operation is returned from step SP16 to step SP6 so that the foregoing sequential process is ended.

If abnormal completion takes place attributable to a latter defect or the like, video data cannot normally be recorded in step SP17. Therefore, the operation of the system control circuit 24 proceeds from step SP17 to step SP20 so that the system control circuit performs rearrangement of data to recover data in the hard disk unit, the operation of which has been completed abnormally. The data rearranging process is a process in which video data or the like (that is, video data or parity data) in each of recorded sectors from the defective sector to a reserve sector is sequentially shifted toward the reserve side by one sector amount so as to be again recorded. Thus, video data or the like which is completed abnormally is again recorded in the sectors following the defective sector. In link with the foregoing process, the system control circuit 24 sequentially updates the contents of the slip list 31.

If the process is not completed by using one blank time slot because the number of sectors which must be processed is changed according to the position of the defective sector, the system control circuit 24 updates the contents of the slip list 31 in accordance with the content of the process. Then, the operation is returned from step SP16 to step SP6. As a result, the rearranging process performed by the system control circuit 24 enables data in the hard disk unit, the operation of which has been completed abnormally, to be recovered by using a plurality of blank time slots or the like to correspond to the position of the defective sector.

(1-1-3) Rearranging Process in System Control Circuit

Figure 6:
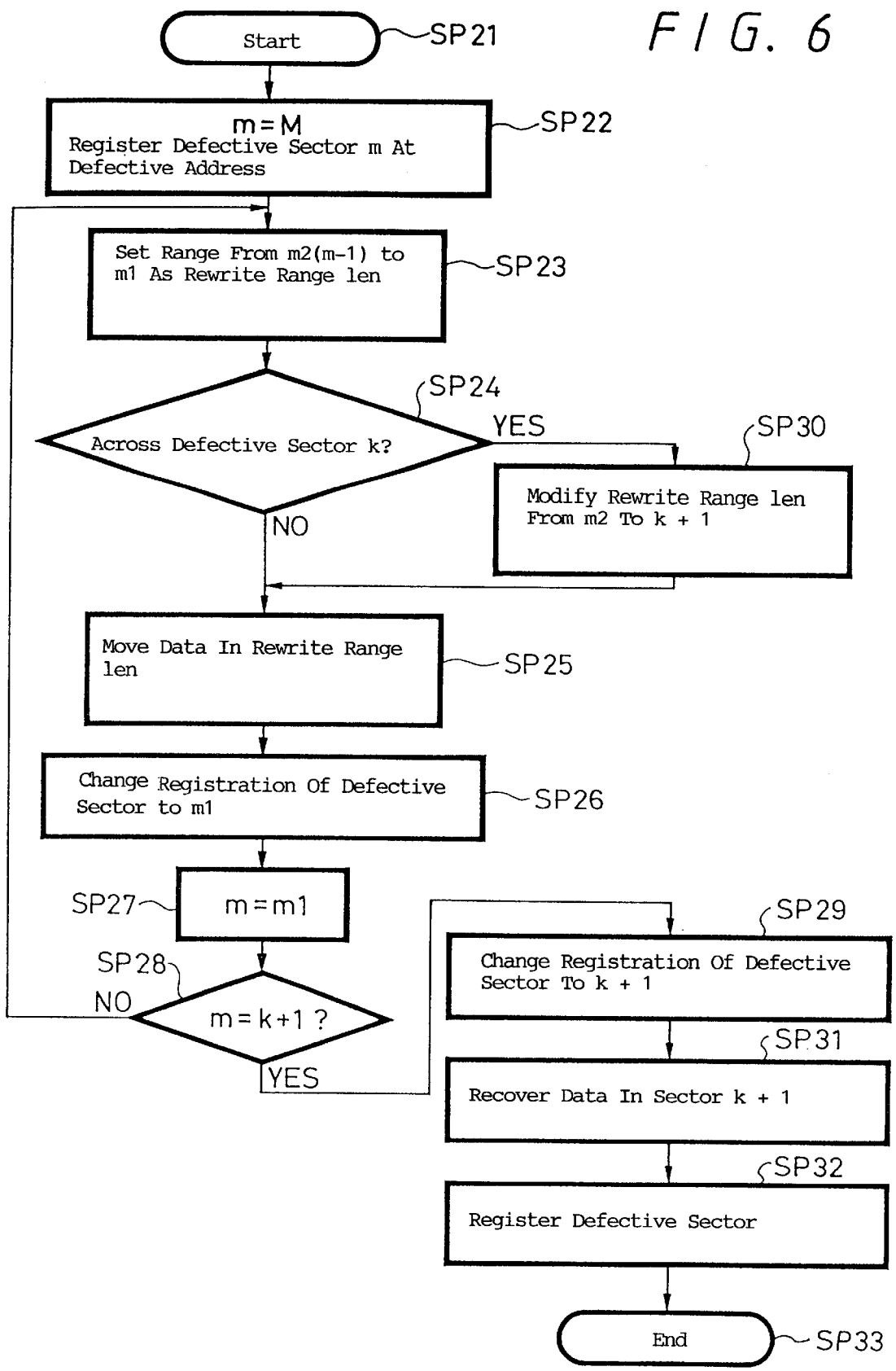
FIG. 6 is a flow chart of a rearranging process.

FIG. 6 is a flow chart collectively showing the rearranging process which is repeated in each of the blank time slots. In this process, the operation of the system control circuit 24 proceeds from step SP21 to step SP22. Thus, the system control circuit sets the address of an unused leading sector M, which is a reserve sector reserved for defective sector k, to be variable m. Then, the system control circuit previously registers, to the slip list 31, a sector of the logical address instructed with the variable m.

In a state where any latter defects has not appeared in the hard disk units 27A to 27F immediately after formatting, the system control circuit 24, as shown in FIG. 7, uses sectors in a predetermined range from the leading end of the logical address of each track (sectors having logical addresses (71) 5 to 104, 115 to 214 and 225 to 324 each of which corresponds address 70 adjacent to video data controller side shown in FIG. 7) to record/reproduce video data and the like. Moreover, the system control circuit makes the sector of the residual logical addresses (sectors having logical addresses (71) 105 to 114 and 215 to 224 shown in FIG. 7) as reserve sector R (see FIG. 7(A)). That is, the system control circuit 24 responds to the addresses issued from the video-data controllers 11A to 11F to issue logical addresses to skip the reserve region.

The system control circuit 24 previously registers the unused and leading logical addresses of the reserve sector to the slip list 31. In next step SP23, the system control circuit sets a rewrite range len. The rewrite range len here is arranged to have a data quantity which can be stored in each of the buffer circuits 28A to 28F. The system control circuit 24 sets the range for the logical addresses instructed with variables m2 (m−1) to m1 to be the rewrite range len (see FIG. 7(B)).

Then, the operation of the system control circuit 24 proceeds to step SP24 so that a result of a comparison between a variable m1 and a variable k is obtained. Thus, the system control circuit determines whether or not the rewrite range len extends over the defective sector k. If a negative result is obtained, the operation proceeds to step SP25. Then, the system control circuit 24 instructs the rewrite range len and issues a read command to the defective hard disk unit of the hard disk units 27A to 27F. Then, the system control circuit causes read video data and the like to be stored in the corresponding buffer circuits 28A to 28F. Further, when the reading process has been completed, the system control circuit 24 adds one to the logical address and issues a write control command so as to again record video data and the like stored in the buffer circuits 28A to 28F on the corresponding hard disk units 27A to 27F. As a result, the system control circuit 24 shifts video data and the like in the rewrite range len toward the reserve sector by one sector amount (see FIG. 7(C)).

Then, the operation of the system control circuit 24 proceeds to step SP26 so that the defective sector registered in step SP22 to the slip list 31 with the variable m is updated to the leading sector in the rewrite range len instructed with the variable m1. Thus, even if an access command is supplied with respect to the sector m1 in a way to repeat the sequential rearranging process, an access is made to skip the sector instructed with the variable m1.

Then, the system control circuit 24 updates the variable m to variable m1, and then determines in step SP28 whether or not the variable m and variable k+1 coincide with each other.

Thus, the system control circuit determines whether or not movement of video data and the like to the sector following the defective sector k has been completed. If a negative result is obtained, the operation is returned to step SP23.

The quantity of data permitted to be moved in one reading and writing process is determined in this embodiment to be a quantity which can be processed in one time slot. As a result, the system control circuit 24 repeats steps SP23 SP24-SP25-SP26-SP27-SP28 in the predetermined blank time slot TS shown in FIG. 1 and each of the substantial blank time slots in each of which an access to the hard disk unit is not required. Thus, the system control circuit sequentially shifts recorded video data and the like from the defective side toward the reserve sector by one sector (see FIGS. 7(D) and 7(E)).

As a result of repetition of the sequential process, the defective sector is to be included in the rewrite range len set in step SP23. If in this case the movement is completed to a position immediately after the defective sector k and the defective sector is included in the following rewrite range len, an affirmative result is previously obtained in step SP28. Therefore, the operation of the system control circuit 24 proceeds from step SP28 to step SP29. If on the contrary the rewrite range len extends over the defective sector k, an affirmative result is obtained in step SP24. Therefore, the operation of the system control circuit 24 proceeds from step SP24 to step SP30.

In step SP30 the system control circuit 24 updates the variable m2 to a variable k+1 so that the rewrite range len is contracted to the sector immediately after the defective sector k (see FIG. 7(F)). Then, the system control circuit performs processes of steps SP25-SP26-SP27-SP28 to shift video data and the like in the modified rewrite range len toward the reserve side by one sector (see FIG. 7(G)). Since an affirmative result is obtained in step SP28 in this case, the operation of the system control circuit 24 is shifted to step SP29.

In step SP29 the system control circuit 24 updates the defective sector instructed with the variable m1 updated in step SP26 to a sector instructed with the variable k+1. Then, the operation proceeds to step SP31 so that video data and the like in the defective sector k is again recorded on the sector k+1. As a result, data in the defective sector is recovered (see FIG. 7(G)). Also in the process for recovering data in the defective sector, the system control circuit 24 reproduces video data and parity data recorded on the other hard disk units, causes the parity calculating circuit 29 to recover video data or parity data in the defective sector and records recovered data on the sector k+1, similarly to step SP19 (see FIG. 5).

After the movement of video data and the like in the rewrite range len has been completed, also the data recovery process is performed in the following blank time slot or the like. In step SP29, the system control circuit 24 therefore registers the sector k+1 immediately after the defective sector k as a defective sector to the slip list 31. As a result, the system control circuit sets to inhibit an access to the sector k+1 in a period to the following blank time slot.

When the system control circuit 24 has completed the process in step SP31, the operation proceeds to step SP32 so that the system control circuit registers the defective sector k in the slip list 31. Then, the operation proceeds to step SP33 so that the process is ended.

Figure 8A:
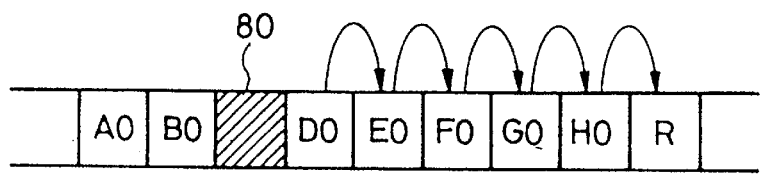
FIGS. 8A and 8B are schematic views showing sectors before and after the rearranging process.
Figure 8B:
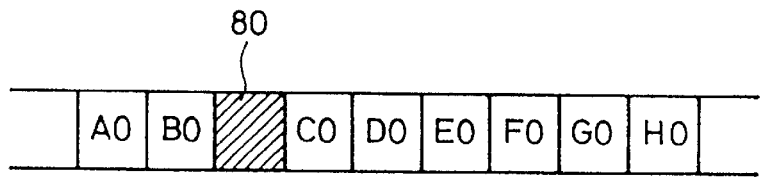

As a result, when a data string composed of video data A, B, . . . , is supplied from any one of the video-data controllers 11A to 11F and a hard disk unit which must store video data A0, B0, . . . , encounters a defect 80 in a sector thereof on which video data C0 must be recorded (see FIG. 8(A), the system control circuit 24 shifts video data toward the reserve side by one sector each. Thus, video data is again recorded as indicated by an arrow (see FIG. 8(B)). As a result, the system control circuit 24 rearranges recorded video data and the like to a configuration similar to that which is realized when video data or parity data is recorded by the slipping process. Moreover, the system control circuit updates the contents of the slip list 31 to respond to the rearrangement. Thus, each of the hard disk units is able to continuously reproduce video data A0, B0, . . . , at a next access in such a manner that only time is taken for magnetic head passes the defective sector. As a result, time required to perform writing and reading can significantly be shortened as compared with a process in which video data and the like in the defective sector are again recorded on an alternative sector.

(1-2) Operation of the Embodiment

With the above-mentioned structure, the video data (see FIG. 2) is compressed in the time base in the video-data controllers 11A to 11F to which video data has been supplied. Moreover, the video data is converted into 48-bit video data. Then, data for one frame amount is, together with the control command or the like, transmitted to the input data bus IN in a time slot having a period which is ⅐ of one frame period and assigned to each of the video-data controllers 11A to 11F. The 48-bit video data item is, by each of eight bits, fetched by each of the disk array apparatuses 12A to 12F so as to be recorded on the hard disk units of the disk array apparatuses 12A to 12F.

On the contrary, the video data recorded on the hard disk unit of each of the disk array apparatuses 12A to 12F is, in the corresponding time slot, read from the hard disk unit so as to be formed into 8-bit data and transmitted to the output data bus OUT. Then, video data is collected into 48 bits, and then fetched by the corresponding video-data controllers 11A to 11F. The above video data items are expanded in the time base, and then formed into a predetermined format and output to an external equipment.

Video data (see FIG. 3) input to the disk array apparatuses 12A to 12F through the data bus IN is supplied to the recording data controller 21 through the interface circuit 20 so as to be separated from the control command and supplied to the data multiplexer 25. Video data is, at one byte unit, assigned and output to the hard disk units 27A to 27F and output to the parity calculating circuit 29. In the parity calculating circuit 29, parity data is generated by the exclusive OR calculation from the above video data. Parity data is output to the hard disk unit 27F. As a result, video data is, together with parity data composed of recovering data, assigned to the hard disk units 27A to 27F so as to be simultaneously and in parallel recorded.

On the other hand, the video data which is transmitted from the disk array apparatuses 12A to 12F to the data bus OUT is, together with parity data, read from the hard disk units 27A to 27F. Then, the video data is returned to have the original data arrangement by the data multiplexer 25. Then, the video data is, together with status data and the like, transmitted through the reproducing data controller 22. If video data cannot normally be read from any one of the hard disk units 27A to 27F attributable to a failure or a defect, video data is temporarily output to the parity calculating circuit 29. Then, the exclusive OR calculation with parity data is performed so that video data, which cannot normally be read, is reproduced. The reproduced video data item is transmitted together with the other video data items.

On the other hand, video data is, in the writing operation, subjected to the read-after-write process in each hard disk unit. If recording and reproduction can normally be performed, a status indicating this is transmitted to the system control circuit 24. If the status indicating completion of normal recording/reproducing cannot be issued in a predetermined time in the time slot attributable to a seeking error or a defect, a control command to interrupt writing is issued from the system control circuit 24. Thus, the writing process is interrupted.

When the reading operation is performed, whether or not normal reproduction from the hard disk unit has been performed is confirmed in accordance with the error correction code added to video data. If normal reproduction is performed, a status indicating this is transmitted to the system control circuit 24. If the status indicating completion of normal reproduction cannot be issued in the predetermined time in the time slot attributable to a seeking error or a defect, a control command to interrupt reading is issued from the system control circuit 24. Thus, the reading process is interrupted.

The sector of video data, subjected to the writing and reading processes which have abnormally been completed, is registered to the memory of the system control circuit 24. In the predetermined blank time slot (see FIG. 1, steps SP1, SP2, SP13 and FIG. 4) and substantial blank time slots (steps SP1, SP2, SP3, SP8, SP11 and SP13) in which an access to the hard disk unit is not required, the above video data is controlled by the system control circuit 24. Thus, the video data is subjected to the process for confirming and recovering abnormal completion without any load, which must be borne by the video-data controllers 11A to 11F, which are the hosts.

In the process for confirming and recovering the abnormal completion (see FIG. 5), test data is recorded on the sector of video data in the operation which has been completed abnormally to perform confirmation. Thus, whether or not video data can normally be recorded is determined (step SP17). If determination is performed that abnormal completion has taken place attributable to an accident, such as external disturbance or the like, video data in the abnormal portion is recovered with data recorded on another hard disk unit (steps SP18 and SP19).

When the operation of the first hard disk unit 27A has abnormally been completed, test data is written on the hard disk unit 27A to perform read-after-write. Thus, whether or not video data can normally be recorded is determined. If a determination is performed that recording can normally be performed, corresponding video data in the hard disk units 27B to 27E are reproduced. Reproduced data are output to the parity calculating circuit 29 through the data multiplexer 25. Simultaneously, corresponding parity data is reproduced from the hard disk unit 27F so as to be output to the parity calculating circuit 29. In the parity calculating circuit 29 the exclusive OR of the video data and the parity data is obtained so that abnormal video data is reproduced. Reproduced video data is output to the hard disk unit 27A through the data multiplexer 25 so as to be again recorded on the abnormal sector.

If a determination is performed that the abnormal completion has occurred attributable to a latter defect, the rearranging process is performed (step SP20). The rearranging process (see FIGS. 6 and 7) is here performed similarly to the slipping process in such a manner that an access is made to the hard disk unit. Thus, the process for updating the slip list 31 is executed and recorded data is again recorded. That is, video data and the like in each of sectors from the corresponding defective sector to the reserve sector on the same track are, at a unit of the predetermined rewrite range len, read from the corresponding hard disk unit of the hard disk units 27A to 27F to the buffer circuits 28A to 28F. Then, the logical address is updated by a value 1 so as to be again recorded on the hard disk unit (steps SP23-SP24-SP25).

As a result, the recorded video data and the like are, at the unit of the rewrite range len, again recorded in a portion shifted to the reserve side by one sector amount. Video data or parity data recorded on the other hard disk unit is used to recover video data in the defective sector in the sector k+1 immediately after the defective sector k (steps SP29–SP31). Moreover, the contents of the slip list 31 are sequentially updated to correspond to the sequential recovering process. Even when video data, which is being rearranged, is recorded/reproduced, the rearranging process can be performed without any interruption of the process for recording/reproducing video data. As a result, video data can be rearranged in such a manner that the defective sector is avoided similarly to the case in which the logical address has been set by the slipping process. Moreover, the contents of the slip list 31 are updated to correspond to the rearranging process.

That is, video data is recorded/reproduced in such a manner that address data output from the video-data controllers 11A to 11F are converted into the logical addresses required for the system control circuit 24 to make accesses to the hard disk units 27A to 27F so that the logical address is output. Moreover, the logical addresses are converted into physical addresses of the hard disk units 27A to 27F by the SCSI controllers 30A to 30F. Thus, the sectors specified with the physical addresses are accessed.

In the SCSI controllers 30A to 30F, the logical addresses are converted into the physical addresses in accordance with the conversion lists 31A to 31F of the logical and physical addresses registered when the hard disk units 27A to 27F have been initialized in such a manner that the defective sector is avoided. As a result, video data is recorded/reproduced to and from the hard disk units 27A to 27F in such a manner that the defective sector is avoided.

On the other hand, the system control circuit 24 generates the logical addresses from address data output from the video-data controllers 11A to 11F. Then, the logical addresses are corrected by the address conversion circuit 30 in accordance with the contents registered to the slip list 31. Thus, video data in the defective sector which has appeared later can be recorded/reproduced to and from the hard disk units 27A to 27F similarly to the access made in the slipping process.

Specifically, if one defective sector is registered as a result of the foregoing rearranging process, accesses to the sectors following the defective sector are made in such a manner that one is added to the logical address of the hard disk unit having the defective sector as compared with the other hard disk units when a control command is issued. As a result, the logical address corresponding to the foregoing rearranging process is issued. When the access is made to bridge the defective sector, the control command is issued to skip the logical address of the defective sector. As a result, the slipping process is performed to avoid the defective sector when an access to the hard disk unit is made.

(1-3) Effect of the Embodiment

The foregoing structure is arranged to use the predetermined blank time slot and the substantial blank time slot, in which an access to the hard disk unit is not required, to thereby recover video data to which an access cannot easily be made. As a result, abnormal video data can be recovered without any interruption of the operations for recording/reproducing video data and without any load which must be borne by the video controllers which are the hosts.

(2) Second Embodiment

Figure 9:
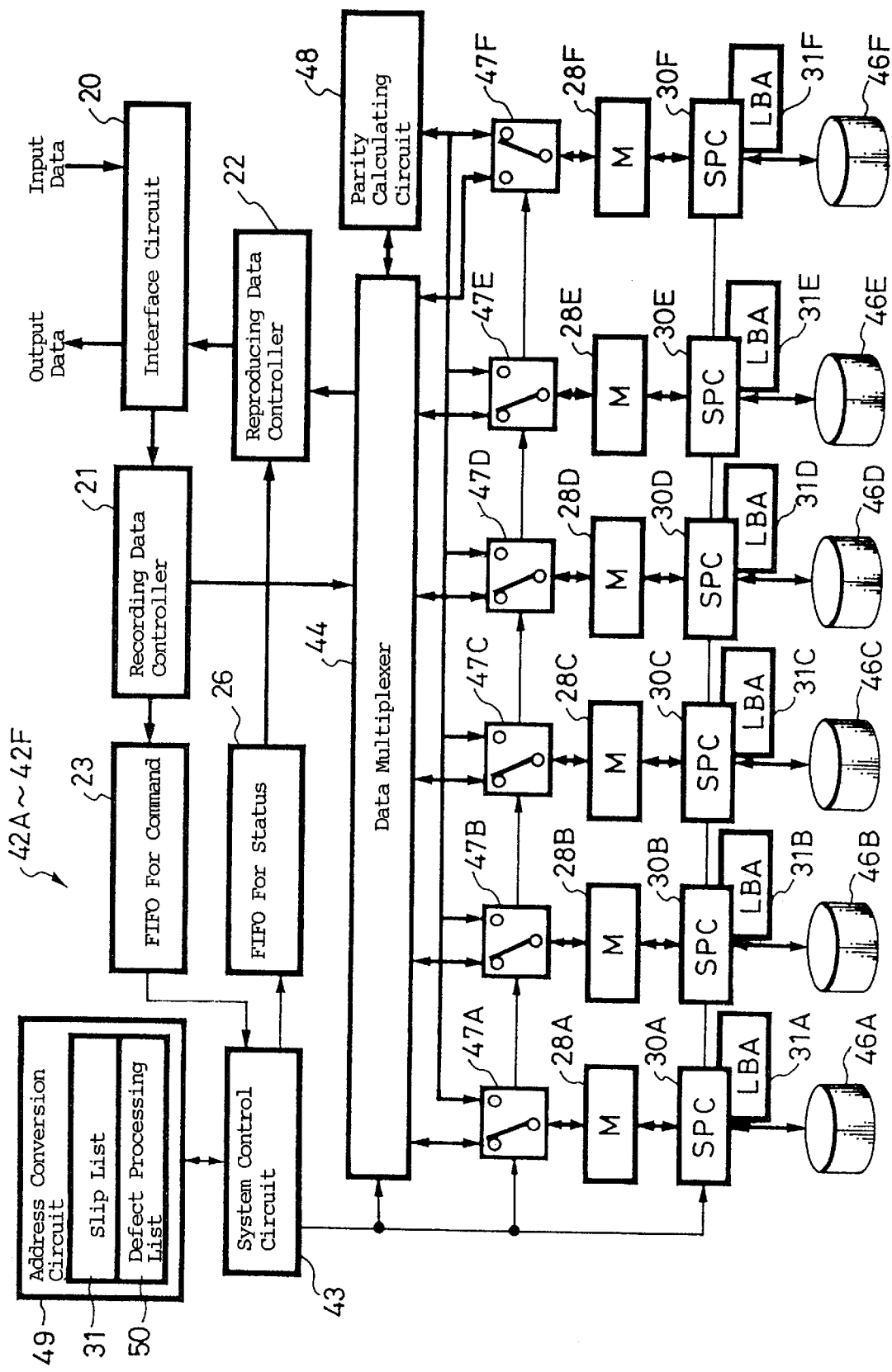
FIG. 9 is a block diagram showing a disk array apparatus of a recording/reproducing apparatus according to a second embodiment of the present invention.

FIG. 9 is a block diagram showing a disk array apparatus. The disk array apparatus according to this embodiment is disposed in place of the disk array apparatuses 12A to 12F shown in FIG. 2 to serve as a recording/reproducing apparatus according to a second embodiment of the present invention. The second embodiment is arranged in such a manner that disk array apparatuses 42A to 42F previously recover abnormal video data. Then, the above-mentioned rearranging process similar to that according to the first embodiment is performed. Thus, the redundancy of the whole system can furthermore be improved.

Moreover, a process similar to the data recovery process is performed for a hard disk unit, which has been exchanged attributable to a failure or the like. Thus, data assigned to the corresponding hard disk unit can be reproduced by internal processes of the disk array apparatuses 42A to 42F.

Furthermore, the passage for video data which must be processed as described above is changed to raise the processing speed. Note that the structures shown in FIG. 9 which are the same as those shown in FIG. 3 are given the same reference numerals and the overlapped explanation there of is omitted from description.

The disk array apparatuses 42A to 42F are structured in such a manner that selection circuits 47A to 47E are disposed between a data multiplexer 44 and the buffer circuits (M) 28A to 28E. Moreover, a similar selection circuit 47F is disposed between a parity calculating circuit 48 and the buffer circuit (M) 28F.

The selection circuits 47A to 47F are controlled by a system control circuit 43 so that their contacts are switched. When a usual recording/reproducing operation is performed, video data and parity data are input/output to and from the data multiplexer 44 through the same passage employed in the first embodiment.

Thus, the data multiplexer 44 inputs/outputs video data to and from the buffer circuits (M) 28A to 28E through the selection circuits 47A to 47E when recording and reproducing are performed, similarly to the data multiplexer 25 according to the first embodiment. Moreover, the data multiplexer inputs/outputs video data to and from the parity calculating circuit 48. As a result, video data and parity data are assigned to hard disk units 46A to 46F so as to be recorded on the same. Moreover, recorded data can be reproduced. If any one of video data items cannot normally be reproduced when the reproducing operation is performed, video data is recovered with other video data items and parity data items.

When the selection circuits 47A to 47F are assigned to data recovery by the system control circuit 43, the selection circuits 47A to 47F except for a selection circuit encountered an abnormal condition cause data output from the buffer circuits 28A to 28F to be output to the data multiplexer 44. On the other hand, any one of the selection circuits 47A to 47F encountered the abnormal condition causes data output from the parity calculating circuit 48 to be output to the buffer circuits 28A to 28F.

If any one of the hard disk units 46A to 46F is exchanged, the residual hard disk units 46A to 46F which have not been exchanged cause data output from the buffer circuits 28A to 28F to be output to the data multiplexer 44. On the other hand, any one of the exchanged hard disk units 46A to 46F causes data output from the parity calculating circuit 48 to be output to the buffer circuits 28A to 28F.

On the contrary, the data multiplexer 44 outputs video data and parity data input through the selection circuits 47A to 47F to the parity calculating circuit 48. The parity calculating circuit 48 outputs a result of calculations to the selection circuits 47A to 47F. As a result, this embodiment having the above-mentioned structure causes the disk array apparatuses 42A to 42F form a data passage in the form of a loop passing hard disk units which can normally be operated to return to the abnormal hard disk unit through the parity calculating circuit 48. If a hard disk unit is exchanged, a data passage is formed which has a loop shape passing from hard disk units 46A to 46F which have not been exchanged to return to the exchanged hard disk unit among the hard disk units 46A to 46F through the parity calculating circuit 48.

As a result, the disk array apparatuses 42A to 42F are enabled to simultaneously and in parallel perform the recording/reproducing process among the abnormal hard disk unit and the normal hard disk units and among the hard disk units which have not been exchanged and the exchanged hard disk unit.

That is, in the first embodiment, the normal video data is supplied from the data multiplexer 25 to the parity calculating circuit 29 to reconstruct video data. Moreover, the reconstructed video data is again transferred to the data multiplexer 25 so as to be again recorded. In this case, data reconstruction 100 and recording 108 of reconstructed data must sequentially be performed as shown in FIG. 10(see FIGS. 10(A) and 10(B)).

Referring to FIG. 10, the data reconstruction 100 is performed in such a manner that command interpretation 102 of a reproduction command 101 is performed, after which seeking 103, waiting for rotation 104 and reproduction 106 are performed. After the waiting for rotation 104 has been performed, data input 105 is performed. After the reproduction 106 has been performed, status input 107 is performed.

When the recording 108 of reconstructed data is performed after the data reconstruction 100 has been performed, interpretation 110 of a recording command 109 is performed, and then seeking 111, waiting for rotation 112 and recording 114 are performed. After data output 113 has been performed, the waiting for rotation 112 is performed. After recording 114 has been performed, status input 115 is performed.

Therefore, the first embodiment must use a high speed hard disk unit to recover data if the time slot 1 is set to be a short time, that is, if the number of the video controllers (see FIG. 2) is increased. If any one of the hard disk units is exchanged because of a failure or the like, video data and parity data are, similarly to the above-mentioned case, recorded on the exchanged hard disk unit. In this case, a long time is required to complete the operation for recording data above.

On the other hand, this embodiment, as shown in FIG. 11 has the structure that the recording/reproducing operation can be performed simultaneously and in parallel between the hard disk units assigned to recording and the hard disk units assigned to reproducing (see FIGS. 11(A) to 11(D)). Data recover can quickly be performed by that extent. Moreover, a process for recording data on the exchanged hard disk unit can be completed in a short time. Therefore, if the redundancy of whole the system temporarily deteriorates because of an abnormal condition or exchange of the hard disk unit and so on, recovery can be performed in a short time. When video data which must be recovered is video data instructed with a reproduction command, an operation is permitted in which data recovery is performed while reconstructed video data is output to the video controller.

Referring to FIG. 11, data reconstruction 116 is performed in such a manner that interpretation 118 of a reproduction command 117 is performed. Then, seeking 119, waiting for rotation 120 and reproduction 121 are performed. After the waiting for rotation 120 has been performed, data input 122 is performed. After the reproduction 121 has been performed, status input 123 is performed.

When recording 124 of reconstructed data is performed in parallel to data reconstruction 116, interpretation 126 of a recording command 125 is performed. Then, seeking 127, waiting for rotation 128 and recording 130 are performed. After data output 129 has been performed, recording 130 is performed. After recording 130 has been performed, status input 131 is performed.

As a result, the parity calculating circuit 48 is able to process input data from the data multiplexer 44 by simply inverting the logical OR and outputting the same as shown in FIGS. 12 and 13 which shows input/output data (video data DV1 to DV5 and parity data DP) in each of the recording operation and data recovery operation and FIGS. 14 and 15 which show the corresponding calculating process. Thus, the processing circuit can be used commonly in the recording operation and the data recovery operation.

In this embodiment, the data multiplexer 44 and the selection circuits 47A to 47F are arranged in such a manner that when data is rearranged in the manner according to the first embodiment such that recorded data is shifted toward the reserve side, data is reconstructed with data reproduced from another hard disk unit to record the same on the corresponding hard disk unit. As a result, time required to rearrange data can be shortened by that extent.

The hard disk units 46A to 46F according to this embodiment are structured in such a manner that a process for replacing defective sector is not performed. As an alternative to this, an individual reserve region is created in a user area set by a slipping process which is performed immediately after the initialization is performed and which can be specified by the system control circuit 43 to make an access to the same. In the hard disk units 46A to 46F, recovered data is initially recorded on the foregoing reserve region in a blank time slot immediately after the occurrence of an abnormal condition after which the data reconstruction process according to the first embodiment is performed.

To correspond to this, the address conversion circuit 49 has a defect processing list 50 in addition to the foregoing slip list 31. Data for managing the reserve region is stored in the defect processing list 50.

As shown in FIG. 16, the managing data is recorded for one byte amount and having a value of 00H, and then the register numbers (MSB) and (LSB) of defective sectors are recorded in such a manner that a space of one-byte identifier is interposed therebetween. That is, if a large number of sectors are rearranged or the like, there is a possibility that a new defect takes place before the rearranging process is completed. Moreover, a plurality of defects of the foregoing type are registered. Accordingly, the number of registered defects is recorded in this embodiment.

Moreover, the addresses (MSB) and (LSB) of the defective sectors indicated with a cylinder No., a track No. and a sector No. are recorded for four bytes. In addition, the addresses of the corresponding reserve sectors are recorded for four bytes. Thus, the addresses of the defective sectors and the addresses of the corresponding reserve sectors are repeated.

Figure 17:
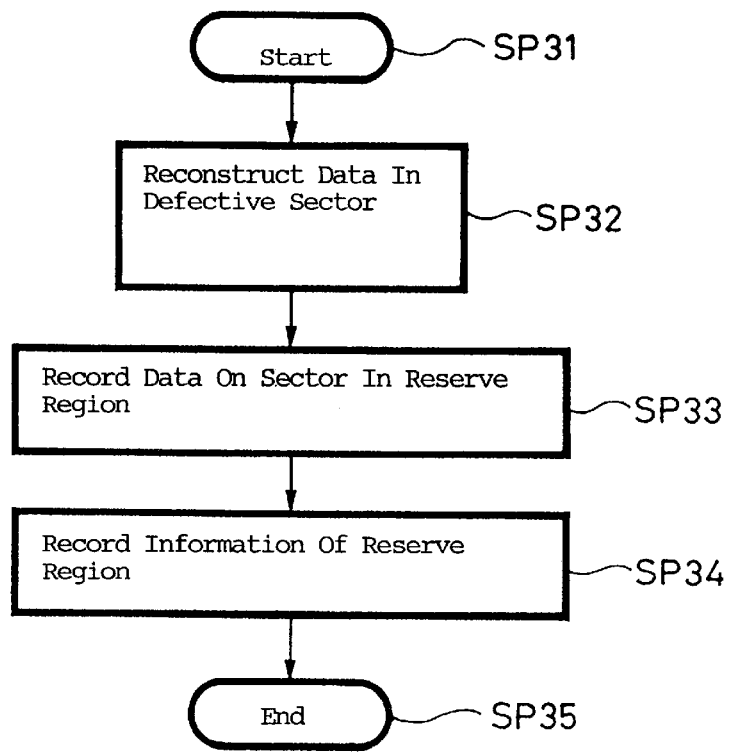
FIG. 17 is a flow chart of the processes which are performed by a system control circuit of the disk array apparatus shown in FIG. 9.

When the rearranging process shown in FIG. 5 is initially performed by the above-mentioned structure, the system control circuit 43 executes a process for recovering data in the defective sector shown in FIG. 17 in place of the rearranging process. That is, after a defect of the foregoing types has been detected in accordance with statuses supplied from the hard disk units 46A to 46F, the system control circuit 43 starts reconstructing data in the defective sector in steps SP31 and SP32 in the first blank time slot. Data in the abnormal hard disk unit is reconstructed by the other hard disk unit.

Further, in next step SP33 the system control circuit 43 outputs, to the corresponding hard disk unit, reconstructed data together with record control command to record reconstructed data on the reserve region in the hard disk unit. Then, the system control circuit 43 registers the address of the defective sector and the address of the corresponding reserve region on the defect processing list in step SP34. Then, the operation of the system control circuit proceeds to step SP35 so that the foregoing process is ended.

Figure 18:
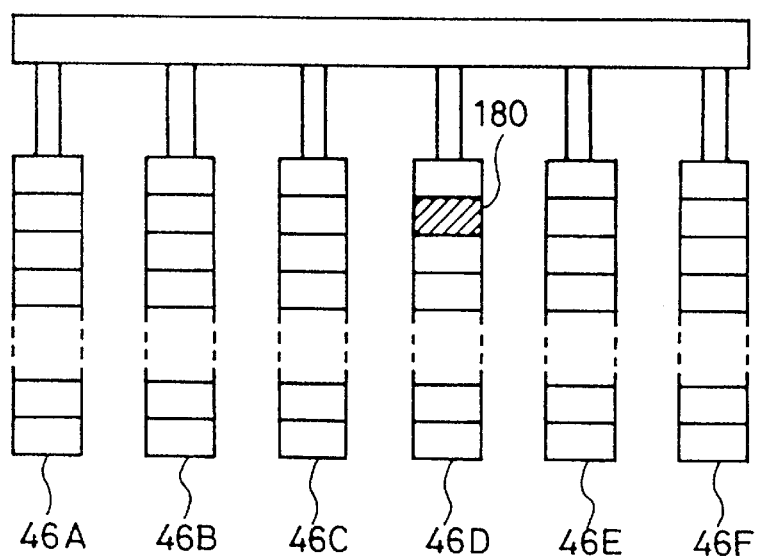
FIG. 18 is a schematic view showing abnormality of a hard disk unit of the disk array apparatus shown in FIG. 9.
Figure 19:
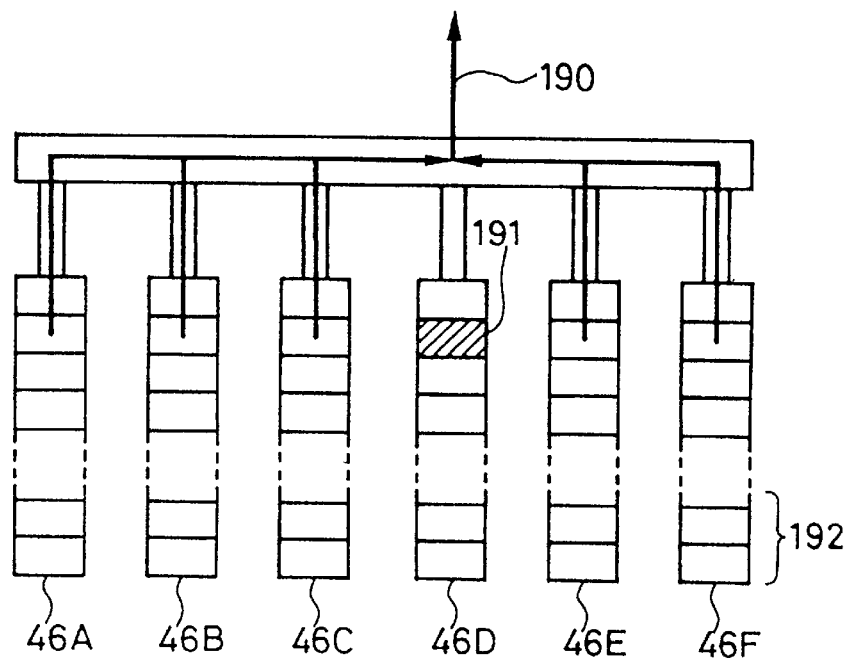
FIG. 19 is a schematic view showing output of video data in the state shown in FIG. 18.
Figure 20:
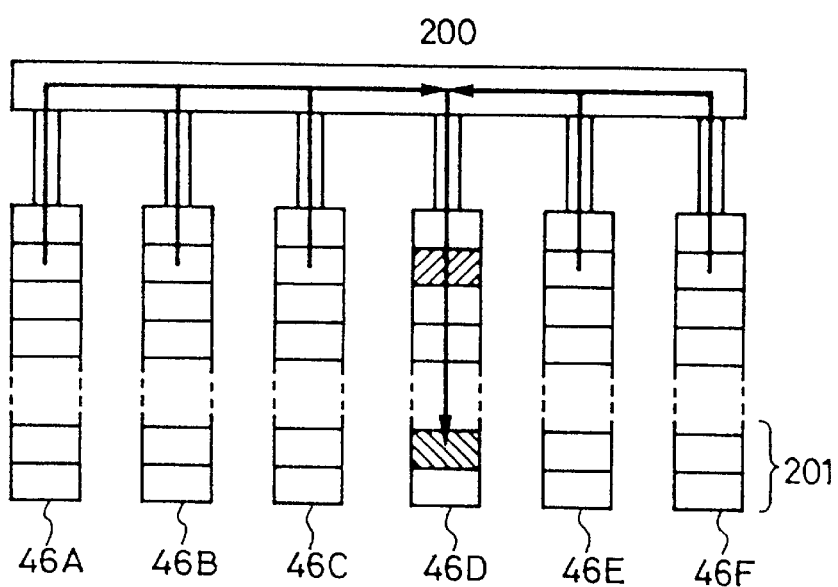
FIG. 20 is a schematic view showing recovery of video data in the state shown in FIG. 18.
Figure 21:
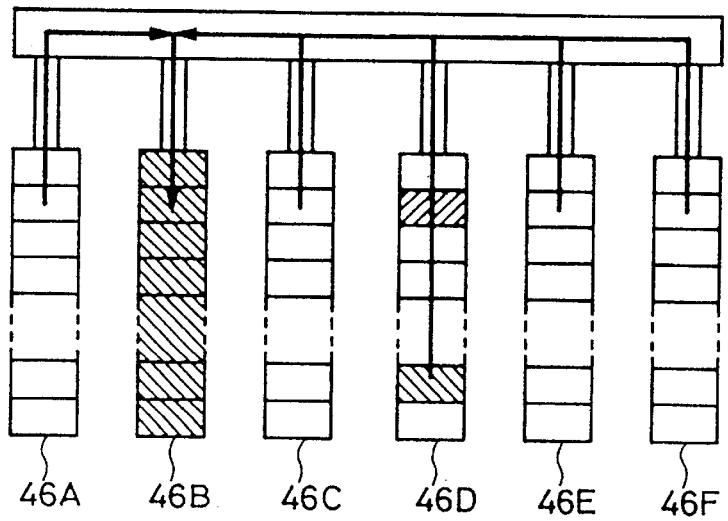
FIG. 21 is a schematic view showing a state where the hard disk unit is exchanged after video data has been recovered in the state shown in FIG. 18.

If an abnormal condition takes place attributable to a defect 180 in the fourth hard disk unit 46D among the hard disk units 46A to 46F as shown in FIG. 18, the disk array apparatus according to this embodiment, as shown in FIG. 19, performs reproduction in such a manner that video data is recovered with data in the other hard disk unit free from a defect 191 to perform output 190. In the blank time slot, video data subjected to reconstruction 200 similarly is, as shown in FIG. 20, recorded on a reserve region 201. As a result, the disk array apparatus according to this embodiment is able to maintain significant redundancy even in a period in which data is being rearranged.

A hard disk unit of the foregoing type may have a so-called alternative sector to automatically record data in the defective sector on the alternative sector. However, a process for recording data on the alternative sector takes a long time. As a result of measurement performed with a hard disk unit having a SCSI interface, for example, about three seconds were required from individual instruction of the alternative process to time at which a status indicating completion was obtained. On the other hand, this embodiment, in which the process for again recording reconstructed data on the user area which can be specified from the outside and access to which is permitted, enables the time required to complete the above-mentioned process to be shortened to a time corresponding to one time slot or shorter.

After the rearranging process has been completed, the system control circuit 43 deletes the defect list and the address of the reserve region which have been rearranged from the defect processing list. As a result, continuous video data can be reproduced from the continuous regions.

Figure 22:
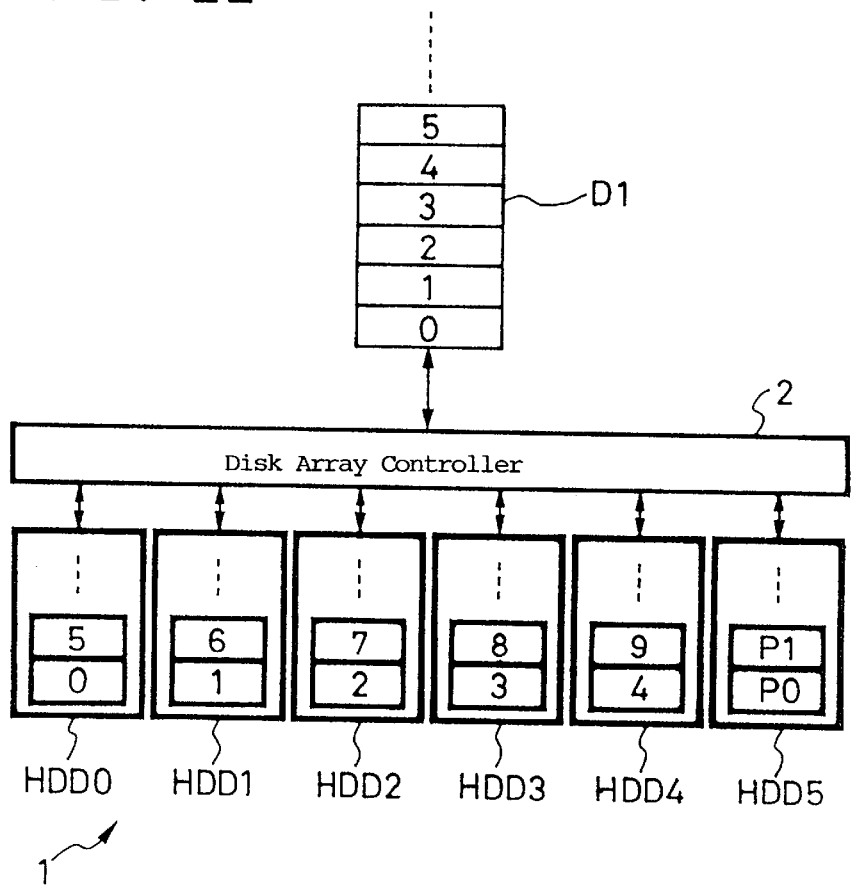
FIG. 22 is a block diagram showing a disk array apparatus forming a RAID.

On the contrary, when the hard disk unit has been exchanged after reconstruction 210 of video data, the system control circuit 43 sets the exchanged hard disk unit 46B to be a recording mode and the residual hard disk units 46A, 46C, 46E, 46F and 46G to be a reproducing mode in the blank time slot, as shown in FIG. 22. Data in the exchanged hard disk unit 46B is recovered so that the redundancy is recovered by the internal process in each disk array apparatus.

The structure shown in FIG. 9 is arranged in such a manner that data in the abnormal hard disk unit is recovered by using a blank time slot. Then, recorded data is rearranged so that deterioration in whole the system is recovered in a short time. Thus, continuous video data can be recorded on continuous regions without any interruption with the process for recording/reproducing continuous data.

Moreover, the passage for data is formed in such a manner that the process for recording data on the abnormal hard disk unit and the process for reproducing the other hard disk units can be performed simultaneously and in parallel. Thus, redundancy, which temporarily deteriorates, can be recovered in a short time.

(3) Another Embodiment

The first embodiment mentioned above has the structure to perform the rearranging process in such a manner that data read from the hard disk unit, operation of which has been completed abnormally, is again recorded and the recording position is shifted by one sector amount. The present invention is not limited to this. The structure according to the first embodiment may be arranged in such a manner that data recorded on the other hard disk unit is used to obtain the exclusive OR so as to be recorded on the hard disk unit, the operation of which has been completed abnormally. Thus, the position, at which video data is recorded, may be shifted by one sector amount. As a result, the rearranging process can be performed quickly.

Although the first embodiment has been described which has the structure that video data in the defective sector is recovered by the rearranging process, the present invention is not limited to this. Video data may be again recorded on the alternative sector if necessary to recover data.

The first and second embodiments described above have the structure in which the predetermined blank time slot and the substantial blank time slot, in which an access to the hard disk unit is not required, are used to recover video data. The present invention is not limited to this. Only predetermined blank time slot may be used to recover data, if necessary. On the contrary, the substantial blank time slot may be used to recover data. In this case, data recovery can be performed without previous setting of the blank time slot.

The second embodiment described above has the structure in which data is reconstructed and recorded on the reserve region after which recorded data is rearranged. The present invention is not limited to this. If a sufficiently long seeking time can be obtained, the rearranging process may be omitted. In this case, each of the disk array apparatus is required to record the contents of the defect processing list 50 (see FIG. 9) on the hard disk unit by using blank time after the operation has been performed. When recording of data on the reserve region is performed, an identifier indicating a fact that the defect processing list of the hard disk units has been updated must be recorded. The identifier may be recorded at the second byte in the defect processing list as indicated with brackets shown in FIG. 16.

The second embodiment mentioned above has the structure in which the process for reconstructing data and recording reconstructed data on the reserve region is performed in the blank time slot. The present invention is not limited to this. The process may arbitrarily be performed when required. If the time slot has a sufficient capacity for processing, the process may be performed in the time slot in which the abnormal condition has appeared.

The above-mentioned second embodiment has the structure in which data recovery is performed by simultaneously and in parallel recording/reproducing data with the arrangement in which the passage for reproducing video data and the passage for recording the same are separated from each other. The present invention is not limited to this. If necessary, the process may be performed in series as is performed in the first embodiment.

The foregoing embodiments have the structure in which the hard disk units form a plurality of recording/reproducing blocks. The present invention is not limited to this. The present invention is widely applied to a structure in which any one of a variety of data recording/reproducing apparatuses, such as a magneto optical disk apparatus or the like, forms the recording/reproducing blocks.

The foregoing embodiments have the structure in which video data and parity data for recovering data are, at one byte unit, assigned to each of the hard disk units. The present invention is not limited to this. The present invention may widely be applied to a process in which data items are assigned in a various manner, if necessary.

Moreover, the foregoing embodiments have the structure that video data of six channel are assigned to six disk array apparatuses each of which is composed of six hard disk units so as to be recorded/reproduced. The present invention is not limited to this. The number of the hard disk units forming each of the disk array apparatuses and that of the disk array apparatuses may arbitrarily be determined. Moreover, the present invention may widely be applied to a process for recording/reproducing video data of various numbers of channels. The present invention may be applied to a structure in which, for example, video data for one channel is assigned to a plurality of recording blocks in order to raise only the data transfer rate required to record/reproduce data.

Although the above-mentioned embodiments have the structure in which the structure according to the present invention is applied to the apparatus for recording/reproducing video data, the present invention is not limited to this. The present invention may widely be employed to apparatuses, for example, an apparatus for recording/reproducing audio data, for recording/reproducing data for processing continuous data.

As described above, according to the present invention, blank time slots are used to recover data, to which a normal access cannot easily be made. Thus, abnormal data can be recovered without any interruption with the process for recording/reproducing sequential data items and without any load which must be borne by the host.

INDUSTRIAL APPLICABILITY

The data recording/reproducing apparatus according to the present invention can be applied to an editing apparatus for recording/reproducing video signals by in parallel operating a plurality of hard disk units and so on.

What is claimed is:

1. A data recording/reproducing apparatus comprising: a plurality of controllers and a plurality of recording/reproducing units having a plurality of recording/reproducing blocks in which operation of the plurality of recording/reproducing blocks is managed in time by a time slot, and required data for record is assigned to the plurality of recording/reproducing blocks so as to simultaneously and in parallel record/reproduce data for record by said plurality of recording/reproducing blocks, said data recording/reproducing apparatus being characterized in that reproduction of recorded data for record in one recording/reproducing unit is enabled with data for record in another recording/reproducing unit by assigning, together with data for recovery, data for record to said plurality of recording/reproducing blocks, and when any one of said plurality of recording/ reproducing blocks in said one recording/reproducing unit has encountered an abnormal condition, said data for record and data for recovery recorded in a recording/reproducing block of another recording/reproducing unit are used to recover data for record in said abnormal recording/reproducing block and then recorded on a recording, reproducing block following said abnormal recording/reproducing block in a time slot in which an access to said abnormal recording/reproducing block is not required.

2. The data recording/reproducing apparatus according to claim 1, characterized in that when said abnormal condition is an abnormal condition in which data for record cannot correctly be recorded in a corresponding time slot, data for record is recovered from said data for record and data for recovery recorded in another recording/reproducing block to again record data for record at a corresponding recording position so that data for record in said abnormal recording/reproducing block is recovered.

3. The data recording/reproducing apparatus according to claim 1, characterized in that when said abnormal condition is an abnormal condition in which said data for record cannot correctly be reproduced in a corresponding time slot, a corresponding recording/reproducing position is avoided and recorded data is rearranged, and then data for record is reproduced and recorded again by using said data for record and data for recovery recorded in another recording/reproducing block so that data for record in said abnormal recording/reproducing block is recovered.

4. The data recording/reproducing apparatus according to claim 3, characterized in that when said abnormal condition is an abnormal condition in which data for record cannot correctly be reproduced in a corresponding time slot, corresponding data for record is again reproduced in a time slot in which an access to said recording/reproducing block is not required to confirm said abnormal condition, and then data for record in said abnormal recording/reproducing block is recovered.

5. The data recording/reproducing apparatus according to claim 1, characterized in that data for record in a plurality of channels are received, and data for record to be assigned to said plurality of recording/reproducing blocks are switched to data for record in said plurality of channels in each of the time slots.

6. A data recording/reproducing apparatus comprising: a plurality of controllers and a plurality of recording/reproducing units having a plurality of recording/reproducing blocks in which in order to recover data in one recording/reproducing unit by data in another recording/reproducing unit, required data is assigned to a plurality of recording/reproducing blocks together with data for recovery to be recorded/reproduced, said data recording/reproducing apparatus being characterized in that required data is recorded/reproduced along concentric tracks or a spiral track, when a defective sector has appeared in the one recording/reproducing unit, recording positions for recorded data following the defective sector are shifted by one sector along said track, and data assigned to said defective sector is recovered with data recorded on a recording/reproducing block of another recording/reproducing unit, and then recorded on a sector following said defective sector.

7. The data recording/reproducing apparatus according to claim 6, characterized in that movement of said recorded data is performed at a unit of a predetermined quantity of data.

8. The data recording/reproducing apparatus according to claim 6, characterized in that a spare sector is prepared in advance and movement of said recorded data is performed from said defective sector to said spare sector.

9. The data recording/reproducing apparatus according to claim 6, characterized in that said recording/reproducing block makes an access to a required sector by using a logical address supplied together with a control command, and said data recording/reproducing apparatus issues said logical address to skip said defective sector.

10. A data recording/reproducing apparatus comprising: a plurality of controllers and a plurality of recording/reproducing units having a plurality of recording/reproducing blocks in which in order to reproduce data for record in one recording/reproducing unit by data for record in another recording/reproducing unit by assigning and recording, together with data for recovery, data for record to a plurality of recording/reproducing blocks so that said data for record is reproduced from said plurality of recording/reproducing blocks, said data recording/reproducing apparatus is characterized in that said plurality of recording/reproducing blocks include an information recording region, which can be specified and accessed from outside, divided into a main information recording region and a sub-information recording region, said data recording/reproducing apparatus assigns and records said data for record and data for recovery to said main information recording region, and when any one of said plurality of recording/reproducing blocks in the one recording/reproducing unit has encountered an abnormal condition, said data for record and data for recovery recorded in a recording/reproducing block of another recording/reproducing unit are used to recover data for record in said abnormal recording/reproducing block, and then recovered data for record is recorded on said sub-information recording region of the one recording/reproducing unit in place of said main information recording region.

11. The data recording/reproducing apparatus according to claim 10, characterized in that a correspondence relation between said sub-information recording region, on which said recovered data for record has been recorded, and a corresponding main information recording region is recorded on a corresponding recording/reproducing block.

12. The data recording/reproducing apparatus according to claim 10, characterized in that operations of said plurality of recording/reproducing blocks are managed in time by a time slot, and characterized in that said data for record and data for recovery recorded in another recording/reproducing block are used to recover data for record in said abnormal recording/reproducing block, and recovered data for record is recorded on said sub-information recording region in place of said main information recording region in a time slot in which access to said recording/reproducing block is not required.

* * * * *